(12) United States Patent
Kimura et al.

(10) Patent No.: US 10,813,087 B2
(45) Date of Patent: *Oct. 20, 2020

(54) APPARATUS AND METHOD

(71) Applicant: Sony Corporation, Tokyo (JP)

(72) Inventors: Ryota Kimura, Tokyo (JP); Ryo Sawai, Tokyo (JP); Hiromasa Uchiyama, Kanagawa (JP); Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/542,324

(22) Filed: Aug. 16, 2019

(65) Prior Publication Data

US 2019/0373591 A1  Dec. 5, 2019

Related U.S. Application Data

(63) Continuation of application No. 15/306,679, filed as application No. PCT/JP2015/060896 on Apr. 7, 2015.

(30) Foreign Application Priority Data

May 28, 2014 (JP) ................................ 2014-110218

(51) Int. Cl.
H04M 11/00 (2006.01)
H04W 72/04 (2009.01)
(Continued)

(52) U.S. Cl.
CPC ......... H04W 72/042 (2013.01); H04M 11/00 (2013.01); H04W 4/24 (2013.01);
(Continued)

(58) Field of Classification Search
CPC ... H04W 48/18; H04W 76/023; H04W 28/08; H04W 36/0027
See application file for complete search history.

(56) References Cited

U.S. PATENT DOCUMENTS 10,425,932 B2 * 9/2019 Kimura ................ H04W 76/12
2009/0005083 A1 1/2009 Hoshino et al.
(Continued)

FOREIGN PATENT DOCUMENTS

CN   101540992 A   9/2009
EP   2056617 A1   5/2009
(Continued)

OTHER PUBLICATIONS

NEC: "Traffic Volume Report", 3GPP, R2-070670-TRAFFICVOLUMEREPORT-SEI, vol. RAN WG2, 20070209, Feb. 9, 2007 (Feb. 9, 2007), XP050133711.
(Continued)

Primary Examiner — Khalid W Shaheed
(74) Attorney, Agent, or Firm — Xsensus LLP

(57) ABSTRACT

To enable management related to transmission and reception of data to be performed while reducing the load on the core network.

Provided is an apparatus including: an acquiring unit configured to acquire data destined for a second terminal device which is transmitted from a first terminal device to a base station of a cellular system; and a control unit configured to control transmission of the data in a manner that the data is transferred from the first terminal device to the second terminal device without going through a gateway configured to perform data transfer in the cellular system. The control unit controls transmission of information related to the data to the gateway or a specific node, and the specific node is a node configured to receive, from the gateway, information related to another data transferred via the gateway.

18 Claims, 38 Drawing Sheets

(51) Int. Cl.
*H04W 76/12* (2018.01)
*H04W 92/14* (2009.01)
*H04W 4/24* (2018.01)
*H04W 88/16* (2009.01)
*H04W 84/04* (2009.01)

(52) U.S. Cl.
CPC ........... *H04W 76/12* (2018.02); *H04W 88/16* (2013.01); *H04W 92/14* (2013.01); *H04W 84/042* (2013.01)

(56) References Cited

U.S. PATENT DOCUMENTS

| | | | |
|---|---|---|---|
| 2010/0184454 A1* | 7/2010 | Luft | H04W 48/02 455/456.5 |
| 2010/0202458 A1 | 8/2010 | Sato | |
| 2010/0232503 A1 | 9/2010 | Morimoto et al. | |
| 2010/0323696 A1 | 12/2010 | Cherian et al. | |
| 2010/0330959 A1 | 12/2010 | Mildh et al. | |
| 2011/0158171 A1 | 6/2011 | Centonza et al. | |
| 2011/0170429 A1 | 7/2011 | Cao et al. | |
| 2011/0176531 A1* | 7/2011 | Rune | H04W 76/22 370/338 |
| 2011/0225113 A1 | 9/2011 | Mann | |
| 2011/0320622 A1 | 12/2011 | Cutler et al. | |
| 2012/0257546 A1* | 10/2012 | Castleberry | H04W 76/12 370/259 |
| 2013/0288668 A1 | 10/2013 | Pragada et al. | |
| 2013/0329560 A1 | 12/2013 | Shomura et al. | |
| 2014/0003348 A1 | 1/2014 | Velev et al. | |
| 2014/0016614 A1 | 1/2014 | Velev et al. | |
| 2014/0329495 A1* | 11/2014 | Park | H04M 15/66 455/406 |
| 2015/0009908 A1* | 1/2015 | Kalapatapu | H04L 12/6418 370/329 |
| 2015/0079937 A1 | 3/2015 | Adachi | |

FOREIGN PATENT DOCUMENTS

| | | |
|---|---|---|
| EP | 2139258 A1 | 12/2009 |
| EP | 2509374 A1 | 10/2012 |
| JP | 2009-302641 A | 12/2009 |
| JP | 2011-507333 A | 3/2011 |
| JP | 2012-110035 A | 6/2012 |
| JP | 2013-536609 A | 9/2013 |
| JP | 2013-258525 A | 12/2013 |
| JP | 2014-510496 A | 4/2014 |
| WO | 2008/023781 A1 | 2/2008 |
| WO | 2009/057204 A1 | 5/2009 |
| WO | 2011/018524 A1 | 2/2011 |
| WO | 2011/099523 A1 | 8/2011 |
| WO | 2013/137460 A1 | 9/2013 |

OTHER PUBLICATIONS

Communication Pursuant to Article 94(3) EPC dated Sep. 17, 2019 in European Application No. 15798744.7-1214.
Extended European Search Report dated Dec. 14, 2017 in corresponding European Patent Application No. 15798744.7, 11 pages.
International Search Report dated Jun. 23, 2015 in PCT/JP2015/060896 filed Apr. 7, 2015.

* cited by examiner

| BASE STATION | TERMINAL DEVICE |
|---|---|
| AAA | CCC |
| AAA | DDD |
| AAA | EEE |
| BBB | FFF |
| BBB | GGG |
| ⋮ | ⋮ |

APPARATUS AND METHOD

CROSS-REFERENCE TO RELATED APPLICATIONS

This application is a continuation of U.S. application Ser. No. 15/306,679, filed Oct. 25, 2016, which is based on PCT filing PCT/JP2015/060896, filed Apr. 7, 2015, and claims priority to JP 2014-110218, filed May 28, 2014, the entire contents of each are incorporated herein by reference.

TECHNICAL FIELD

The present disclosure relates to an apparatus and a method.

BACKGROUND ART

In recent years, cellular networks have become widespread. Cellular networks generally include radio access networks and core networks. For example, in a radio access network, a base station receives data from a terminal device or transmits data to a terminal device. In a core network, for example, transmission and reception of data with an external network, transfer of data between the base stations, and the like are performed.

For transmission and reception of data in a cellular network, various techniques have been proposed. For example, Patent Literature 1 discloses a technique in which a UE divides transmission packets into first packets and second packets, transmits the first packets to another terminal via only an eNodeB, and transmits the second packets to another terminal via an access gateway and an eNodeB.

CITATION LIST

Patent Literature

Patent Literature 1: JP 2012-110035A

SUMMARY OF INVENTION

Technical Problem

However, in the technique disclosed in Patent Literature 1, for example, since some data is transmitted to another terminal via the access gateway, a load on the core network is unlikely to be sufficiently reduced. Further, in the technique disclosed in Patent Literature 1, for example, since some data is transmitted to another terminal without going through the access gateway, it is difficult to perform management related to transmission and reception of data in the cellular network.

In this regard, it is desirable to provide a mechanism that enables management related to transmission and reception of data to be performed while reducing the load on the core network.

Solution to Problem

According to the present disclosure, there is provided an apparatus including: an acquiring unit configured to acquire data destined for a second terminal device which is transmitted from a first terminal device to a base station of a cellular system; and a control unit configured to control transmission of the data in a manner that the data is transferred from the first terminal device to the second terminal device without going through a gateway configured to perform data transfer in the cellular system. The control unit controls transmission of information related to the data to the gateway or a specific node, and the specific node is a node configured to receive, from the gateway, information related to another data transferred via the gateway.

According to the present disclosure, there is provided a method including: acquiring data destined for a second terminal device which is transmitted from a first terminal device to a base station of a cellular system, controlling, by a processor, transmission of the data in a manner that the data is transferred from the first terminal device to the second terminal device without going through a gateway configured to perform data transfer in the cellular system; and controlling, by the processor, transmission of information related to the data to the gateway or a specific node. The specific node is a node configured to receive, from the gateway, information related to another data transferred via the gateway.

Advantageous Effects of Invention

According to the present disclosure described above, management related to transmission and reception of data can be performed while the load on the core network is reduced. Note that the effects described above are not necessarily limited, and along with or instead of the effects, any effect that is desired to be introduced in the present specification or other effects that can be expected from the present specification may be exhibited.

DESCRIPTION OF EMBODIMENT(S)

Figure 1:
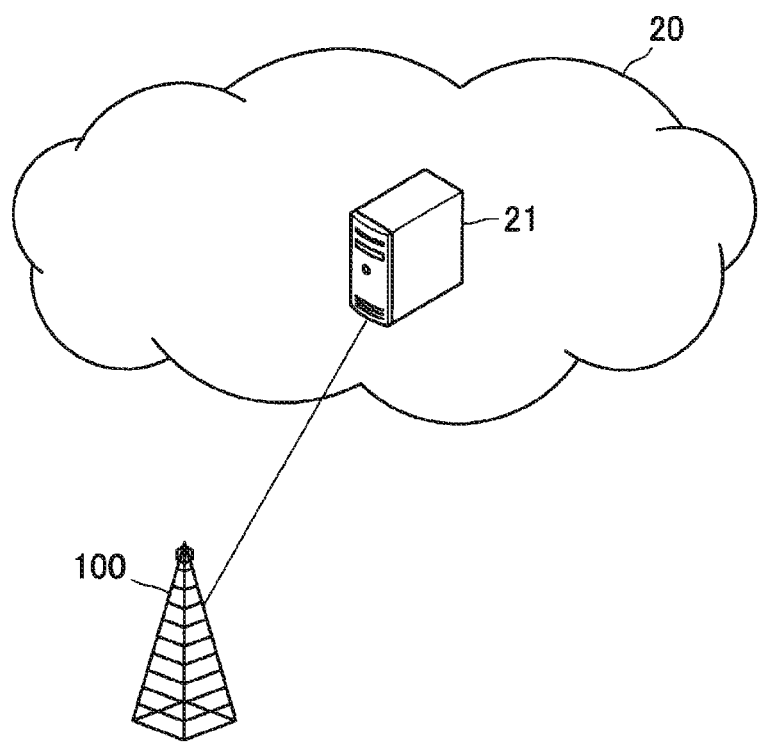
FIG. 1 is an explanatory diagram for describing an example of a schematic configuration of a cellular system according to a first embodiment.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

In this specification and the drawings, there are cases in which components having substantially the same functional configuration are distinguished by adding different alphabets to the end of the same reference numeral. For example, a plurality of components having substantially the same functional configuration are distinguished like a terminal device 30A and a terminal device 30B, as necessary. However, when a plurality of components having substantially the same functional configuration need not be particularly distinguished, only the same reference numeral is added. For example, when the terminal device 30A and the terminal device 30B need not be particularly distinguished, they are referred to simply as a "terminal device 30."

The description will proceed in the following order.
1. First Embodiment
1.1. Configuration of cellular system
1.2. Configuration of base station
1.3. Flow of process
1.4. Modified example
2. Second Embodiment
2.1. Configuration of cellular system
2.2. Configuration of network device
2.3. Flow of process
2.4. Modified example
3. Third Embodiment
3.1. Configuration of cellular system
3.2. Configuration of network controller
3.3. Flow of process
4. Application examples
4.1. Application examples for base station
4.2. Application examples for network device
5. Conclusion «1. First Embodiment»

A first embodiment of the present disclosure will be described with reference to FIGS. 1 to 15.

<1.1. Configuration of Cellular System>

First, a schematic configuration of a cellular system 1-1 according to the first embodiment will be described with reference to FIG. 1. FIG. 1 is an explanatory diagram for describing an example of a schematic configuration of the cellular system 1-1 according to the first embodiment.

Referring to FIG. 1, the cellular system 1-1 according to the first embodiment includes a base station 100 and a gateway 21. The cellular system 1-1 is, for example, a system that conforms to LTE, LTE-Advanced, or a communication standard equivalent thereto.

The base station 100 is a base station of the cellular system 1-1 and functions as a node of a radio access network (RAN) of the cellular system 1-1. For example, the base station 100 performs wireless communication with a terminal device located in a communication area (that is, a cell) of the base station 100. Specifically, for example, the base station 100 transmits data and control information to a terminal device and receives data and control information from a terminal device.

The gateway 21 is a gateway of the cellular system 1-1 and functions as a node of a core network (CN) of the cellular system 1-1. For example, the gateway 21 performs data transfer in the cellular system 1-1. For example, the gateway 21 performs data transfer between the base stations and performs data transfer between another gateway and the base station. Another gateway performs data transfer between the cellular system 1-1 and the external network. Specifically, for example, the gateway 21 is a serving gateway (S-GW), and the other gateway is a packet data network (PDN) gateway (P-GW).

There may be a network device (for example, a router or the like) between the base station 100 and the gateway 21. It will be appreciated that the cellular system 1-1 may include one or more other base stations.

According to the first embodiment, the base station 100 transmits data destined for a second terminal device which is transmitted from a first terminal device to the base station 100 so that the data is transferred from the first terminal device to the second terminal device without going through the gateway 21. The base station 100 transmits information related to the data to the gateway 21 or a specific node. The specific node is a node that receives information related to other data transferred via the gateway 21 from the gateway 21.

<1.2. Configuration of Base Station>

Figure 2:
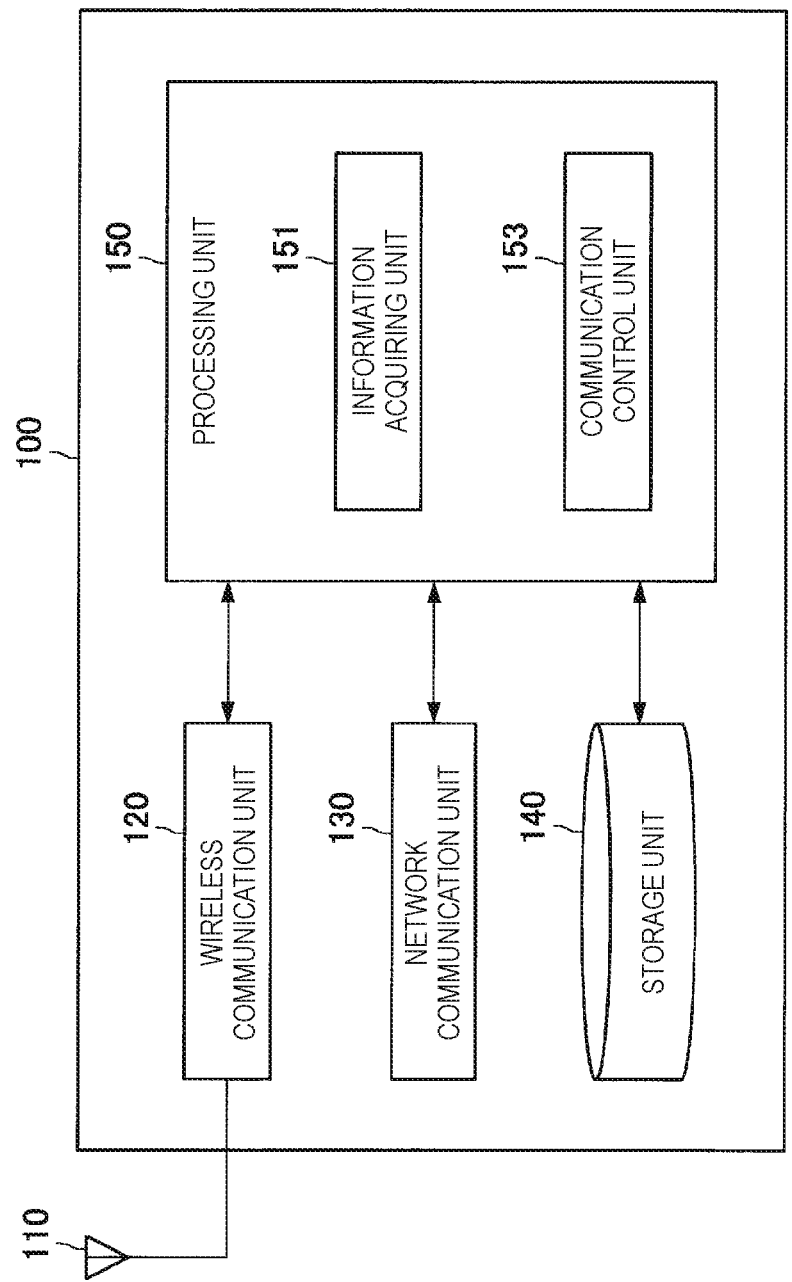
FIG. 2 is a block diagram illustrating an example of a configuration of a base station according to the first embodiment.

Next, an example of a configuration of the base station 100 according to the first embodiment will be described with reference to FIG. 2 to FIG. 8. FIG. 2 is a block diagram illustrating an example of a configuration of the base station 100 according to the first embodiment. Referring to FIG. 2, the base station 100 includes an antenna unit 110, a wireless communication unit 120, a network communication unit 130, a storage unit 140, and a processing unit 150.

(Antenna Unit 110)

The antenna unit 110 radiates a signal output from the wireless communication unit 120 into the air as radio waves. The antenna unit 110 converts the radio waves in the air into a signal, and outputs the signal to the wireless communication unit 120.

(Wireless Communication Unit 120)

The wireless communication unit 120 transmits or receives a signal. For example, the wireless communication unit 120 transmits the downlink signal to the terminal device positioned within the communication area of the base station 100 (that is, a cell), and receives the uplink signal from the terminal device positioned within the communication area.

(Network Communication Unit 130)

The network communication unit 130 performs communication with another node. For example, the network communication unit 130 performs communication with the gateway 21. For example, the network communication unit 130 performs communication with another base station.

(Storage Unit 140)

The storage unit 140 temporarily or permanently stores a program and data for an operation of the base station 100.

(Processing Unit 150)

The processing unit 140 provides various functions of the base station 100. The processing unit 150 includes an information acquiring unit 151 and a communication control unit 153. The processing unit 150 may further include any other component in addition to the above-mentioned components. In other words, the processing unit 150 may also perform an operation other than operations of the above-mentioned components.

(Information Acquiring Unit 151)

The information acquiring unit 151 acquires data destined for the second terminal device which is transmitted from the first terminal device to the base station 100.

For example, the first terminal device transmits data to the base station 100. Then, the base station 100 receives the data and stores the data in the storage unit 140. Thereafter, at any timing, the information acquiring unit 151 acquires the data from the storage unit 140.

(Communication Control Unit 153)

(a) Transmission of Data

The communication control unit 153 controls transmission of the data (that is, the data destined for the second terminal device which is transmitted from the first terminal device to the base station 100).

Transfer of Data without Going Through Gateway 21

Particularly, in the first embodiment, the communication control unit 153 controls transmission of the data so that the data is transferred from the first terminal device to the second terminal device without going through the gateway 21.

Condition

For example, when a condition for the transfer from the first terminal device to the second terminal device is satisfied, the communication control unit 153 performs control on transmission of the data such that the data is transferred from the first terminal device to the second terminal device without going through the gateway 21.

Specifically, for example, the condition is that the data is able to be transferred from the first terminal device to the second terminal device without going through the gateway 21. In other words, when the data is able to be transferred from the first terminal device to the second terminal device without going through the gateway 21, the communication control unit 153 performs control on transmission of the data such that the data is transferred from the first terminal device to the second terminal device without going through the gateway 21.

As an example, the base station 100 stores a table used for determining whether or not the data is able to be transferred without going through the gateway 21 in the storage unit 140, and the communication control unit 153 determines whether or not the data is able to be transferred without going through the gateway 21 based on the table. A specific example of the table will be described below with reference to FIG. 3.

Figures 3, 4:
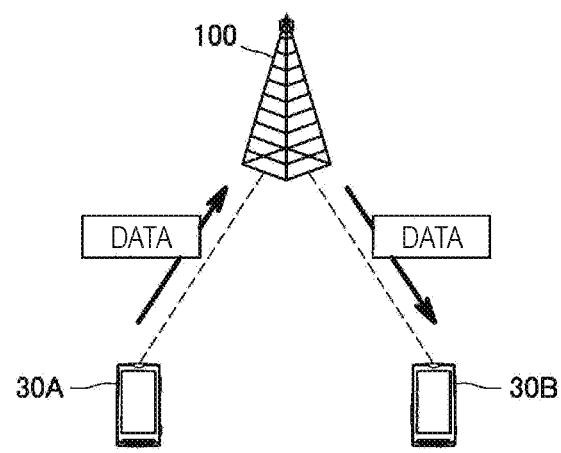
FIG. 3 is an explanatory diagram for describing an example of a table used for determining whether or not data is can be transferred without going through a gateway.
FIG. 4 is an explanatory diagram for describing a first example of transmission of data destined for a second terminal device.

FIG. 3 is an explanatory diagram for describing an example of the table used for determining whether or not the data is able to be transferred without going through the gateway 21. Referring to FIG. 3, the table includes pairs of identification information (for example, AAA and BBB) of identification information of the base station and identification information (for example, CCC, DDD, EEE, FFF and GGG) of the terminal device. More specifically, the table includes pairs of identification information of other base stations capable of receiving data from the base station 100 without the data going through the gateway 21 and the base station 100 and identification information of terminal devices capable of performing communication with the base stations (for example, terminal devices connected to the base stations) (for example, a pair of AAA and CCC). For example, when the identification information of the second terminal device is in the table, the communication control unit 153 determines that the data is able to be transferred without going through the gateway 21. On the other hand, when there is no identification information of the second terminal device serving as the destination of the data in the table, the communication control unit 153 determines that the data is not able to be transferred without going through the gateway 21.

For example, the table is provided by any one node or generated by the base station 100 based on information provided by any one node. As an example, the table is provided by the network controller 500 according to the third embodiment which will be described later. As another example, the table is provided by any one core network node (for example, a Mobility Management Entity (MME), an S-GW, or the like).

Specific Examples of Transmission

As a first example, when the base station 100 can perform communication with the second terminal device, the base station 100 directly transmits the data destined for the second terminal device to the second terminal device. Regarding this point, a specific example will be described below with reference to FIG. 4.

FIG. 4 is an explanatory diagram for describing a first example of transmission of the data destined for the second terminal device. Referring to FIG. 4, the base station 100, a first terminal device 30A, and a second terminal device 30B are illustrated. The first terminal device 30A transmits the data destined for the second terminal device 30B to the base station 100. In this example, since the base station 100 can perform communication with the second terminal device 30B, the base station 100 directly transmits the data to the second terminal device 30B.

As a second example, when another base station capable of receiving the data from the base station 100 without the data going through the gateway 21 can perform communication with the second terminal device, the base station 100 transmits the data destined for the second terminal device to another base station. Regarding this point, a specific example will be described below with reference to FIG. 5.

Figure 5:
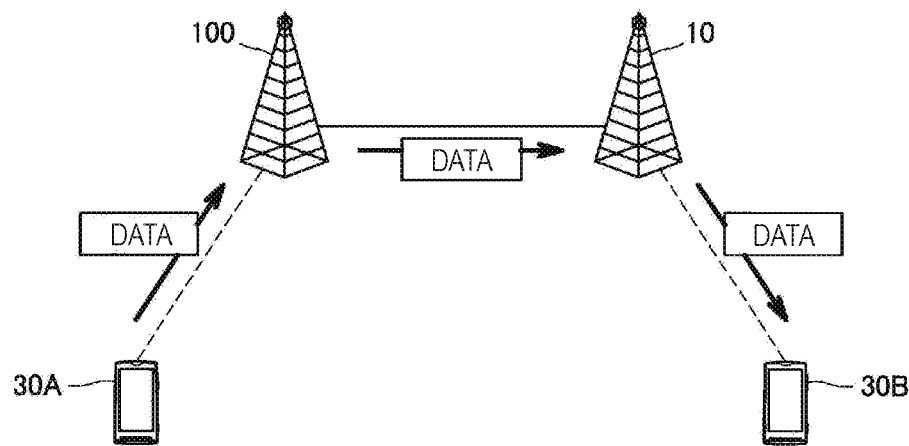
FIG. 5 is an explanatory diagram for describing a second example of transmission of data destined for a second terminal device.

FIG. 5 is an explanatory diagram for describing a second example of transmission of the data destined for the second terminal device. Referring to FIG. 5, the base station 100, the first terminal device 30A, and the second terminal device 30B are illustrated. The first terminal device 30A transmits the data destined for the second terminal device 30B to the base station 100. In this example, since another base station 10 capable of receiving the data from the base station 100 without the data going through the gateway 21 can perform communication with the second terminal device 30B, the base station 100 transmits the data to another base station 10. Then, another base station 10 transmits the data to the second terminal device 30B.

Specific Examples of Transmission Control

As a first example, when the base station 100 can perform communication with the second terminal device, the communication control unit 153 triggers transmission of the data from the base station 100 to the second terminal device. As a result, the base station 100 wirelessly transmits the data to the second terminal device.

As a second example, when another base station capable of receiving the data from the base station 10 without the data going through the gateway 21 can perform communication with the second terminal device, the communication control unit 153 generates a packet destined for another base station including the data destined for the second terminal device, and causes the network communication unit 130 to transmit the packet.

Transfer of Data Via Gateway 21

It will be appreciated that the communication control unit 153 may control transmission of the data such that the data is transferred from the first terminal device to the second terminal device via the gateway 21.

Condition

For example, when the condition for the transfer from the first terminal device to the second terminal device is not satisfied, the communication control unit 153 may control transmission of the data such that the data is transferred from the first terminal device to the second terminal device via the gateway 21.

Specific Example of Transmission

For example, the base station 100 transmits the data destined for the second terminal device to the gateway 21.

Specific Example of Transmission Control

For example, the communication control unit 153 generates a packet destined for the gateway 21 including the data destined for the second terminal device, and causes the network communication unit 130 to transmit the packet.

(b) Transmission of Data-Related Information

As described above, for example, the communication control unit 153 controls transmission of the data such that the data (that is, the data destined for the second terminal device which is transmitted from the first terminal device to the base station 100)) is transferred from the first terminal device to the second terminal device without going through the gateway 21. In this case, the communication control unit 153 controls transmission of information related to the data (hereinafter referred to as "data-related information") to the gateway 21 or a specific node. In other words, through control by the communication control unit 153, the base station 100 transmits the data-related information to the gateway 21 or the specific node.

Data Serving as Target

For example, the data-related information is information related to data of packet units. In other words, the base station 100 transmits the data-related information of packet units to the gateway 21 or the specific node. The packet may be a packet that is transmitted to and received from the terminal device or may be a packet that is transmitted and received between the base stations or between the base station and the gateway 21.

The data-related information may be information related to data of session units. In other words, the base station 100 transmits the data-related information of session units to the gateway 21 or the specific node.

Data-related Information

Terminal Information

For example, the data-related information includes information about at least one of the first terminal device and the second terminal device (hereinafter referred to as "terminal information"). In other words, the data-related information includes information about a transmission source and destination of the data.

For example, the terminal information includes identification information of at least one of the first terminal device and the second terminal device. More specifically, for example, the terminal information includes an ID (for example, a temporary ID, a permanent ID, or the like) or an address (for example, an Internet Protocol (IP) address).

For example, it is possible to detect a terminal device that performs transmission and reception of data based on the terminal information.

Data Amount Information

For example, the data-related information includes information indicating an amount of the data destined for the second terminal device (hereinafter referred to as "data amount information").

As described above, for example, the data-related information is information related to data of packet units. In this case, for example, the data amount information is a data size for a packet. The data size may be a data size of the entire packet (a header portion and a data portion) or may be a data size of a part of the packet (for example, a data portion).

As described above, the data-related information may be information related to data of session units. In this case, the data amount information may be an amount of packets that are transmitted and received within a session or may be a size of all data that is transmitted and received within a session.

It is possible to detect, for example, an amount of data that is transmitted and received based on the data amount information.

Resource Amount

The data-related information may include information indicating an amount of radio resources used for transmission of the data (hereinafter referred to as "resource amount information").

As a specific example, the resource amount information may be the number of resource blocks, the number of sub frames, the number of slots, the number of transport blocks, or the number of sub carriers, or a combination of one or more of these. The amount of radio resources indicated by the resource amount information may include the amount of radio resources necessary for retransmission or may not include the amount of radio resources necessary for retransmission.

It is possible to detect, for example, the amount of radio resources used for transmission and reception of data based on the resource amount information.

The resource amount information may be generated by a function such as a physical layer, a Media Access Control (MAC) layer, or a Radio Resource Control (RRC) layer of wireless communication.

SPECIFIC EXAMPLES

As an example, the data-related information may include information for charging. More specifically, for example, the data-related information includes the terminal information and the data amount information (or the resource amount information) as the information for charging.

It is possible to perform charging for transmission and reception of data based on the information for charging even when transmission is performed without going through the gateway 21.

In this case, the communication control unit 153 may control transmission of the data-related information to the gateway 21 or the specific node through a Bearer Binding and Event Reporting Function (BBERF). In other words, the BBERF is also installed in the base station 100, and the data-related information may be transmitted through the BBERF.

Technique of Acquiring Data-related Information

For example, the communication control unit 153 generates the data-related information. Then, the communication control unit 153 acquires the generated data-related information.

Accordingly, for example, the gateway 21 or the specific node can acquire the data-related information without adding a new function to the terminal device or the network device (for example, a router or the like).

Transmission Destination of Data-related Information

Gateway 21

For example, the communication control unit 153 controls transmission of the data-related information to the gateway 21. In other words, through control by the communication control unit 153, the base station 100 transmits the data-related information to the gateway 21. Regarding this point, a specific example will be described below with reference to FIGS. 6 and 7.

Figure 6:
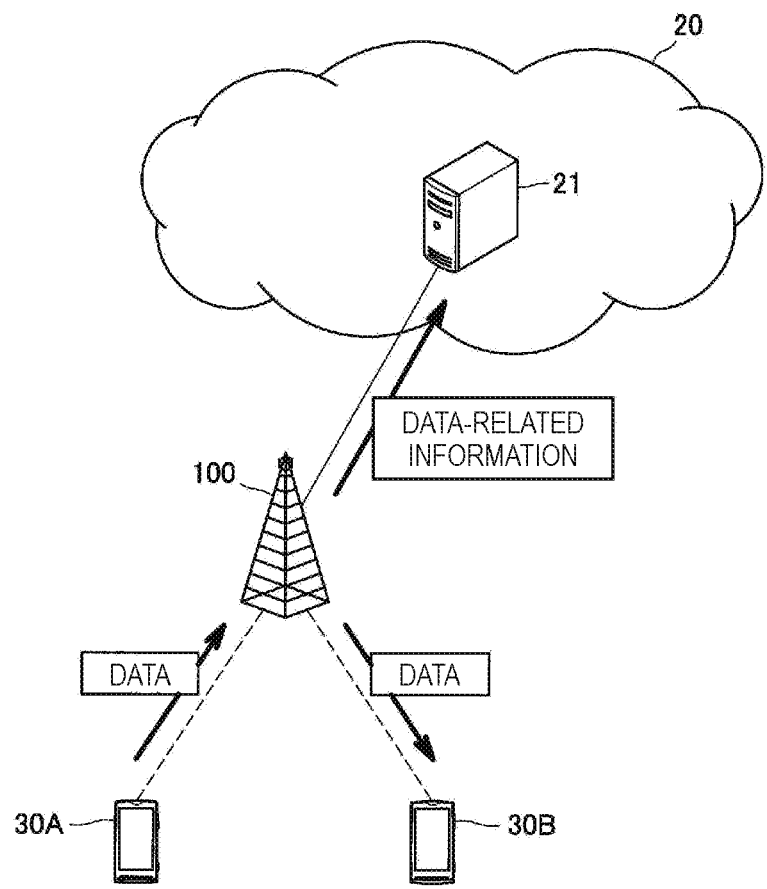
FIG. 6 is an explanatory diagram for describing a first example of transmission of data-related information according to the first embodiment.

FIG. 6 is an explanatory diagram for describing a first example of transmission of the data-related information according to the first embodiment. Referring to FIG. 6, the base station 100, the gateway 21, the first terminal device 30A, and the second terminal device 30B are illustrated. In this example, similarly to the example illustrated in FIG. 4, the base station 100 directly transmits the data destined for the second terminal device 30B which is transmitted from the first terminal device 30A to the base station 100 to the second terminal device 30B. The base station 100 transmits the information related to the data (that is, the data-related information) to the gateway 21.

Figure 7:
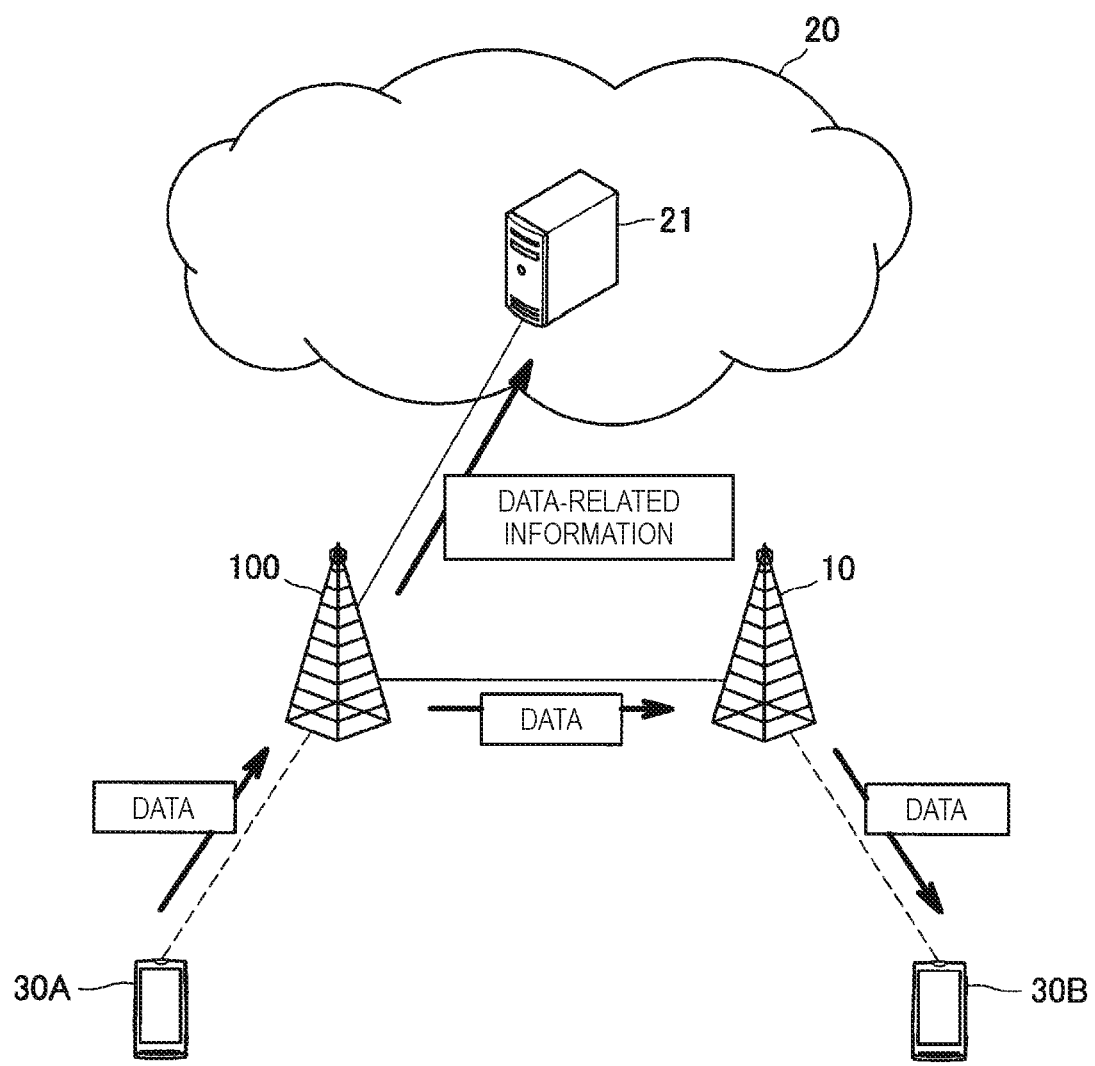
FIG. 7 is an explanatory diagram for describing a second example of transmission of data-related information according to the first embodiment.

FIG. 7 is an explanatory diagram for describing a second example of transmission of the data-related information according to the first embodiment. Referring to FIG. 7, the base station 100, the gateway 21, the first terminal device 30A, and the second terminal device 30B are illustrated. In this example, similarly to the example illustrated in FIG. 5, the base station 100 transmits the data destined for the second terminal device 30B which is transmitted from the first terminal device 30A to the base station 100 to another base station 10 capable of performing communication with the second terminal device 30B. The base station 100 transmits the information related to the data (that is, the data-related information) to the gateway 21.

Accordingly, for example, the gateway 21 can acquire the information related to the data transferred without going through the gateway 21. Thus, the gateway 21 can transmit the information related to both of the data transferred via the gateway 21 and the data transferred without going through the gateway 21 to a specific node (for example, a node having a Policy and Charging Rules Function (PCRF)).

Specific Node

Alternatively, the communication control unit 153 may control transmission of the data-related information to the specific node. In other words, through control by the communication control unit 153, the base station 100 may transmit the data-related information to the specific node. The specific node is a node that receives information related to other data transferred via the gateway 21 (hereinafter, "other data-related information") from the gateway 21. As an example, the specific node is a node having the PCRF. Regarding this point, a specific example will be described below with reference to FIG. 8.

Figure 8:
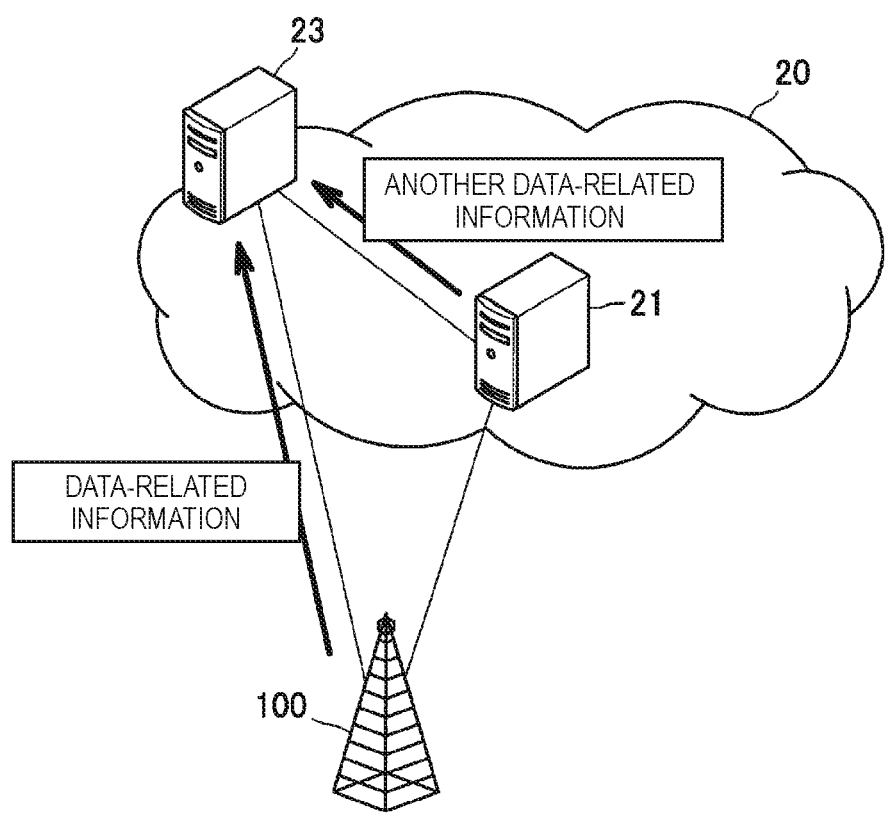
FIG. 8 is an explanatory diagram for describing a third example of transmission of data-related information according to the first embodiment.

FIG. 8 is an explanatory diagram for describing a third example of transmission of the data-related information according to the first embodiment. Referring to FIG. 8, the base station 100, the gateway 21, and a specific node 23 are illustrated. In this example, similarly to the examples illustrated in FIGS. 4 and 5, data is transferred from the first terminal device to the second terminal device without going through the gateway 21. Particularly, in this example, the base station 100 transmits the information related to the data (that is, the data-related information) to the specific node 23. The gateway 21 transmits the information related to other data transferred via the gateway 21 (that is, other data-related information) to the specific node 23.

Accordingly, for example, the specific node can acquire the information related to the data transferred via the gateway 21 (that is, other data-related information) and the information related to the data transferred without going through the gateway 21 (that is, the data-related information).

Specific Example of Transmission Control

As described above, for example, the communication control unit 153 controls transmission of the data-related information to the gateway 21. In this case, the communication control unit 153 generates the packet destined for the gateway 21 including the data-related information, and causes the network communication unit 130 to transmit the packet.

Alternatively, as described above, the communication control unit 153 may control transmission of the data-related information to the specific node. In this case, the communication control unit 153 generates the packet destined for the specific node including the data-related information, and causes the network communication unit 130 to transmit the packet.

The configuration of the base station 100 according to the first embodiment has been described above. As described above, the information acquiring unit 151 acquires the data destined for the second terminal device which is transmitted from the first terminal device to the base station 100. The communication control unit 153 controls transmission of the data such that the data is transferred from the first terminal device to the second terminal device without going through the gateway 21. The communication control unit 153 controls transmission of the information related to the data (that is, the data-related information) to the gateway 21 or the specific node. Accordingly, for example, it is possible to perform management related to transmission and reception of data while reducing the load on the core network. More specifically, for example, since data is transferred without going through the gateway 21, the load on the gateway 21 from transfer of data is reduced. Further, since the data-related information is transmitted to the gateway 21 or the specific node, it is also possible to perform management related to transmission and reception of data without going through the gateway 21. Furthermore, a delay related to data transfer can be reduced.

<1.3. Flow of Process>

Next, an example of a process according to the first embodiment will be described with reference to FIGS. 9 to 11.

First Example

Figure 9:
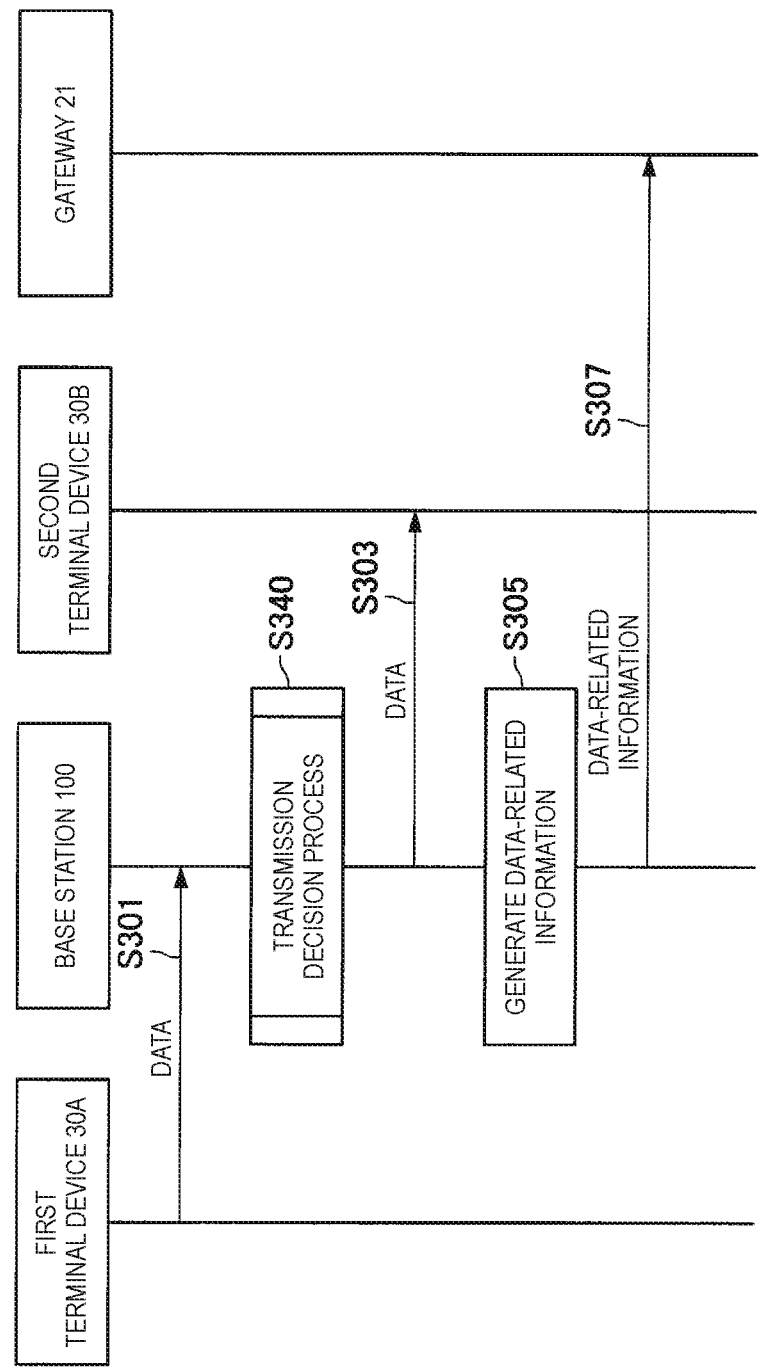
FIG. 9 is a sequence diagram illustrating a first example of a schematic flow of a process according to the first embodiment.

FIG. 9 is a sequence diagram illustrating a first example of a schematic flow of a process according to the first embodiment.

The first terminal device 30A transmits the data destined for the second terminal device 30B to the base station 100 (S301).

Then, the base station 100 performs the transmission decision process (S340). In other words, the base station 100 determines whether or not the data is able to be transferred from the first terminal device 30A to the second terminal device 30B without going through the gateway 21 and decides a node to which the data is transmitted. In this example, since the base station 100 can perform communication with the second terminal device 30B, the data is determined to be able to be transferred without going through the gateway 21, and the data is decided to be directly transmitted to the second terminal device 30B.

Thereafter, the base station 100 directly transmits the data to the second terminal device 30B (S303).

The base station 100 generates the information related to the data (that is, the data-related information) (S305). Then, the base station 100 transmits the data-related information to the gateway 21 (S307).

The base station 100 may transmit the data-related information to the specific node instead of the gateway 21.

Second Example

Figure 10:
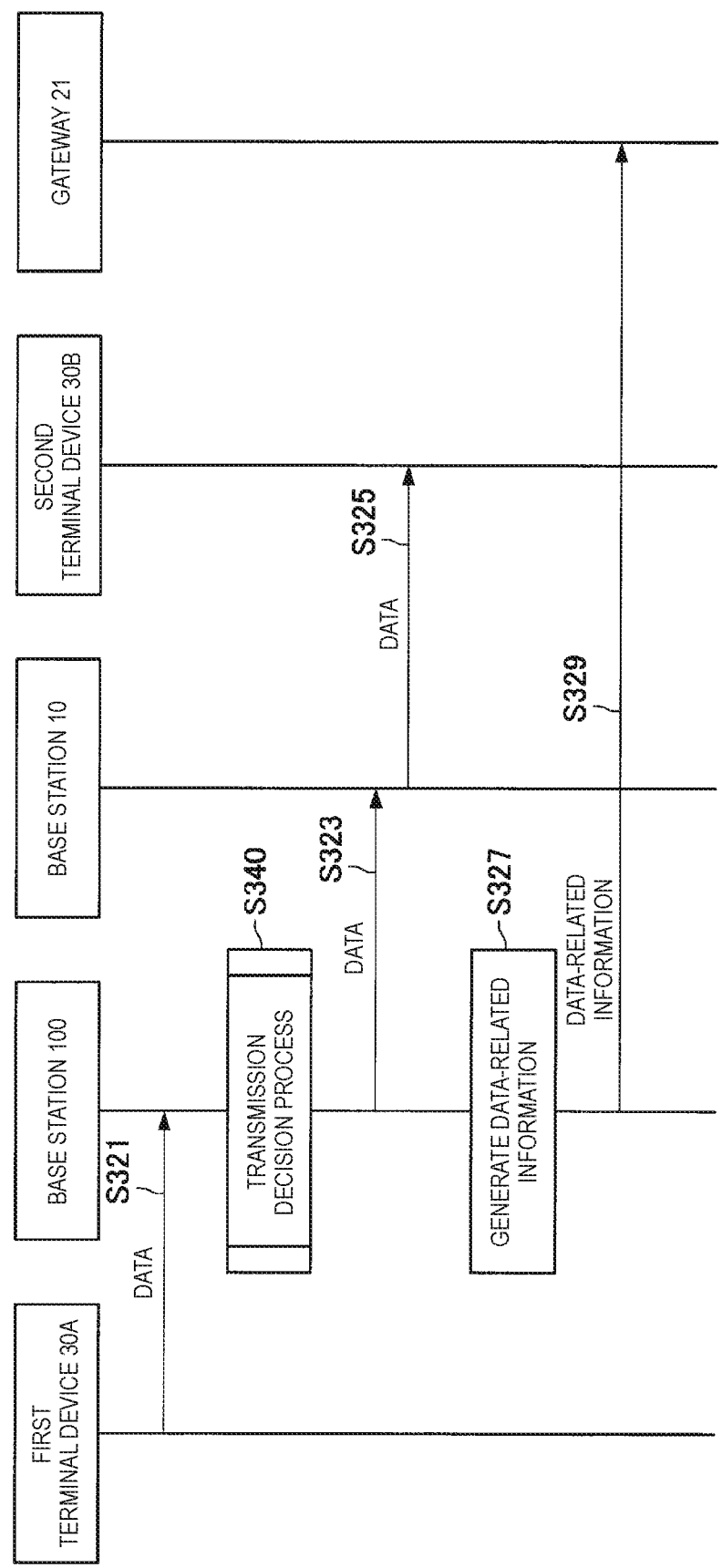
FIG. 10 is a sequence diagram illustrating a second example of a schematic flow of a process according to the first embodiment.

FIG. 10 is a sequence diagram illustrating a second example of the schematic flow of the process according to the first embodiment.

The first terminal device 30A transmits the data destined for the second terminal device 30B to the base station 100 (S321).

Then, the base station 100 performs the transmission decision process (S340). In other words, the base station 100 determines whether or not the data is able to be transferred from the first terminal device 30A to the second terminal device 30B without going through the gateway 21 and decides a node to which the data is transmitted. In this example, since another base station 10 capable of receiving the data from the base station 100 without the data going through the gateway 21 can perform communication with the second terminal device 30B, the data is determined to be able to be transferred without going through the gateway 21, and the data is decided to be transmitted to another base station 10.

Thereafter, the base station 100 transmits the data to another base station 10 (S323). Then, another base station 10 transmits the data to the second terminal device 30B (S325).

Further, the base station 100 generates the information related to the data (that is, the data-related information) (S327). Then, the base station 100 transmits the data-related information to the gateway 21 (S329).

The base station 100 may transmit the data-related information to the specific node instead of the gateway 21.

(Transmission Decision Process)

Figure 11:
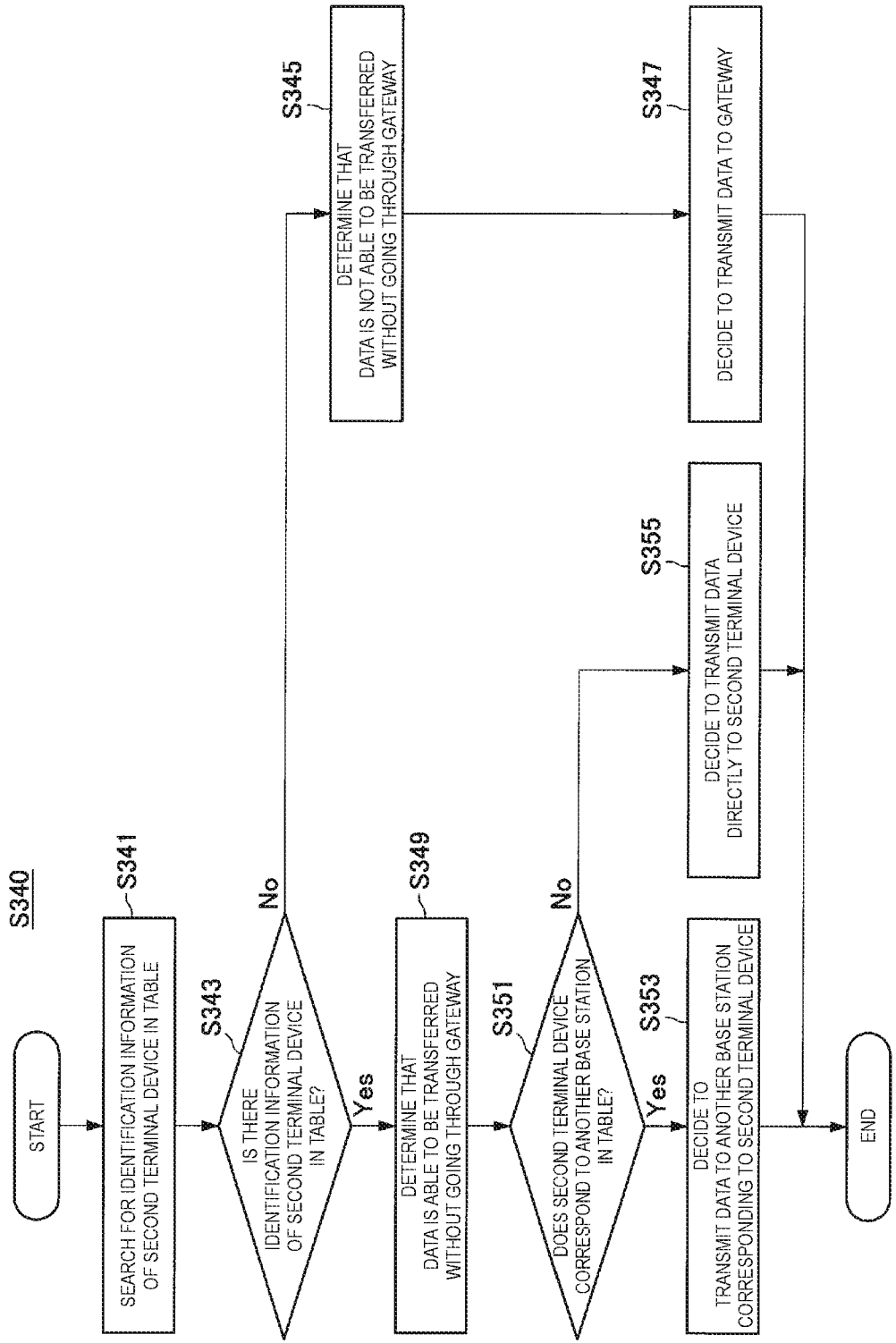
FIG. 11 is a flowchart illustrating an example of a schematic flow of a transmission decision process according to the first embodiment.

FIG. 11 is a flowchart illustrating an example of a schematic flow of the transmission decision process according to the first embodiment.

The communication control unit 153 searches for the identification information of the second terminal device 30B in the table stored in the storage unit 140 (S341).

When there is no identification information of the second terminal device 30B in the table (NO in S343), the communication control unit 153 determines that the data destined for the second terminal device 30B is not able to be transferred without going through the gateway 21 (S345). Then, the communication control unit 153 decides to transmit the data to the gateway 21 (S347). Then, the process ends.

On the other hand, when the identification information of the second terminal device 30B is in the table (YES in S343), the communication control unit 153 determines that the data destined for the second terminal device 30B is able to be transferred without going through the gateway 21 (S349).

Further, when the second terminal device 30B corresponds to another base station 10 in the table (YES in S351), the communication control unit 153 decides to transmit the data to another base station 10 (S353). Then, the process ends.

On the other hand, when the second terminal device 30B corresponds to the base station 100 in the table (NO in S351), the communication control unit 153 decides to transmit the data directly to the second terminal device 30B (S355). Then, the process ends.

<1.4. Modified Example>

Next, a modified example of the first embodiment will be described with reference to FIGS. 13 to 15.

In the example of the first embodiment, the base station 100 (the communication control unit 153) generates the data-related information. On the other hand, in the modified example of the first embodiment, the first terminal device generates the data-related information, and transmits an integrated packet in which the data and the data-related information are encapsulated to the base station 100. Then, the base station 100 separates the data and the data-related information from the integrated packet.

Accordingly, for example, the load on the base station 100 can be reduced.

(Base Station 100: Information Acquiring Unit 151)

In the modified example of the first embodiment, the information acquiring unit 151 acquires the integrated packet in which the data and the data-related information are encapsulated, and separates the data and the data-related information from the integrated packet.

Specifically, for example, the first terminal device generates the data-related information, and generates the integrated packet in which the data and the data-related information are encapsulated. Then, the first terminal device transmits the integrated packet to the base station 100. Then, the information acquiring unit 151 acquires the integrated packet, and separates the data and the data-related information from the integrated packet. Accordingly, the information acquiring unit 151 acquires the data and the data-related information. A specific example of the integrated packet will be described below with reference to FIG. 12.

Figure 12:
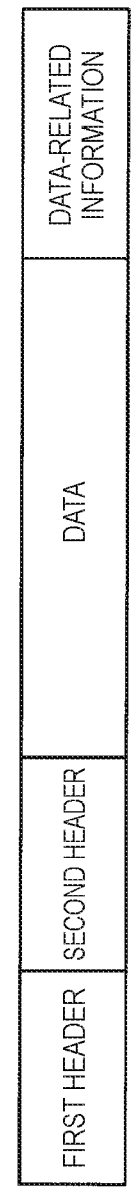
FIG. 12 is an explanatory diagram for describing an example of an integrated packet.

FIG. 12 is an explanatory diagram for describing an example of the integrated packet. Referring to FIG. 12, an integrated packet 50 is illustrated. For example, the integrated packet 50 includes a first header, a second header, data, and the data-related information. The first header is a header for transmission, and includes information such as a transmission source address and a destination address. For example, the integrated packet 50 is an IP packet, and the first header is an IP header. The second header is a header for encapsulation of the data and the data-related information includes information about the data and the data-related information. As an example, the second header includes the number of pieces of individual information included in the integrated packet (for example, 2), and a type (for example, the data or the data-related information) and a size (for example, the number of bytes) of each individual piece of information. It is possible to separate the data and the data-related information based on the second header. The second header may be included in the first header.

For example, the integrated packet includes predetermined indication information indicating that the data and the data-related information are encapsulated in the integrated packet. In this case, when the packet (that is, the integrated packet) including the predetermined indication information is acquired, the information acquiring unit 151 separates the data and the data-related information from the packet. As an example, the predetermined indication information is included in the second header illustrated in FIG. 12. For example, the load on the base station 100 can be further reduced based on the predetermined indication information.

(Base Station 100: Communication Control Unit 153)

(b) Transmission of Data-related Information

Technique of Acquiring Data-related Information

In the modified example of the first embodiment, since the information acquiring unit 151 acquires the data-related information as described above, the communication control unit 153 does not generate the data-related information.

(Specific Example of Transmission of Data and Data-related Information)

Figure 13:
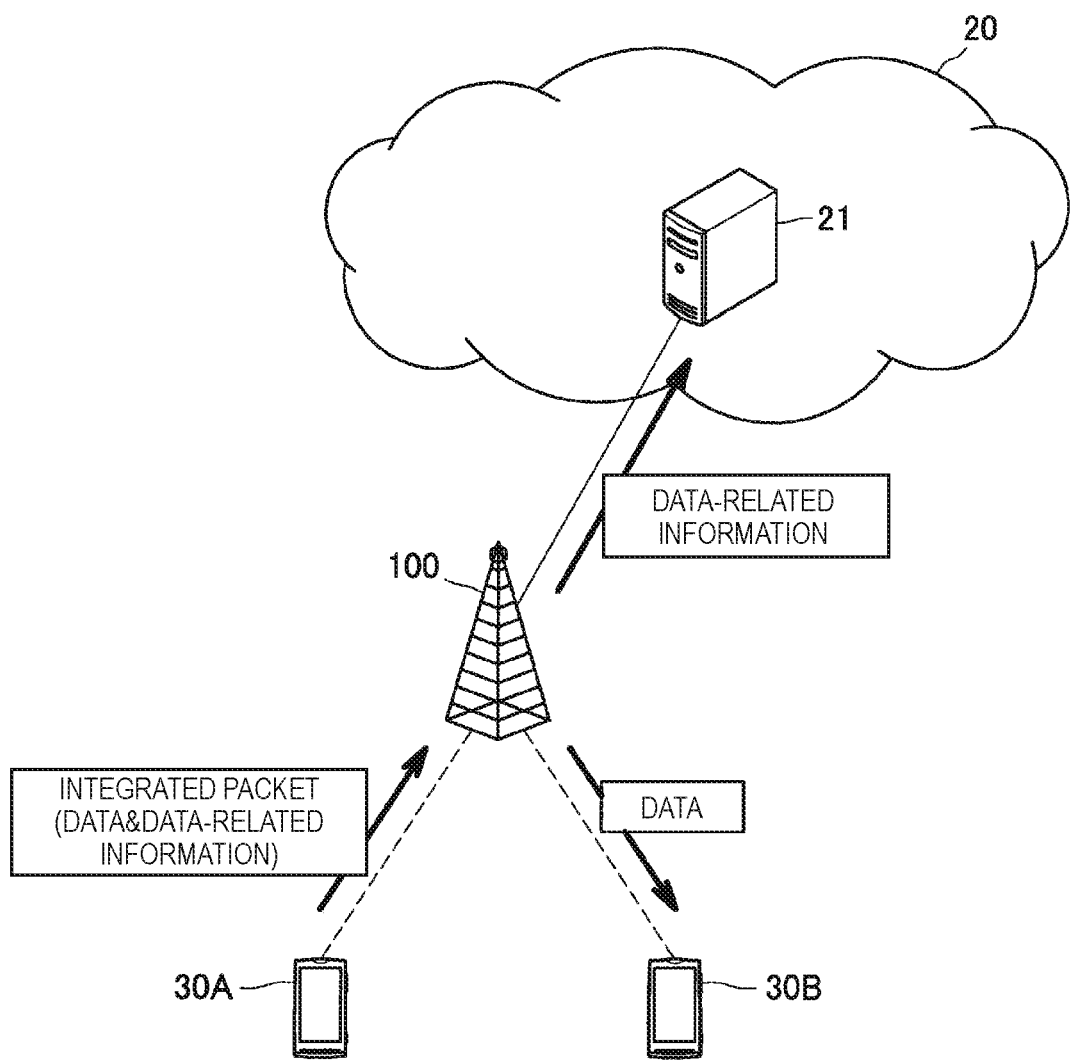
FIG. 13 is an explanatory diagram for describing an example of transmission of data and data-related information according to a modified example of the first embodiment.

FIG. 13 is an explanatory diagram for describing an example of transmission of the data and the data-related information according to the modified example of the first embodiment. Referring to FIG. 13, the base station 100, the gateway 21, the first terminal device 30A, and the second terminal device 30B are illustrated. The first terminal device 30A transmits the integrated packet in which the data and the data-related information are encapsulated to the base station 100. Then, the base station 100 separates the data and the data-related information from the integrated packet. In this example, since the base station 100 can perform communication with the second terminal device 30B, the base station 100 directly transmits the data to the second terminal device 30B. Further, the base station 100 transmits the data-related information to the gateway 21.

In the example illustrated in FIG. 13, the base station 100 can perform communication with the second terminal device 30B, but the modified example of the first embodiment is not limited to the relevant example. For example, another base station capable of receiving the data from the base station 10 without the data going through the gateway 21 can perform communication with the second terminal device 30B, and the base station 100 may transmit the data to another base station.

In the example illustrated in FIG. 13, the base station 100 transmits the data-related information to the gateway 21, but the modified example of the first embodiment is not limited to the relevant example. For example, the base station 100 may transmit the data-related information to the specific node instead of the gateway 21.

(Flow of Process: First Example)

Figure 14:
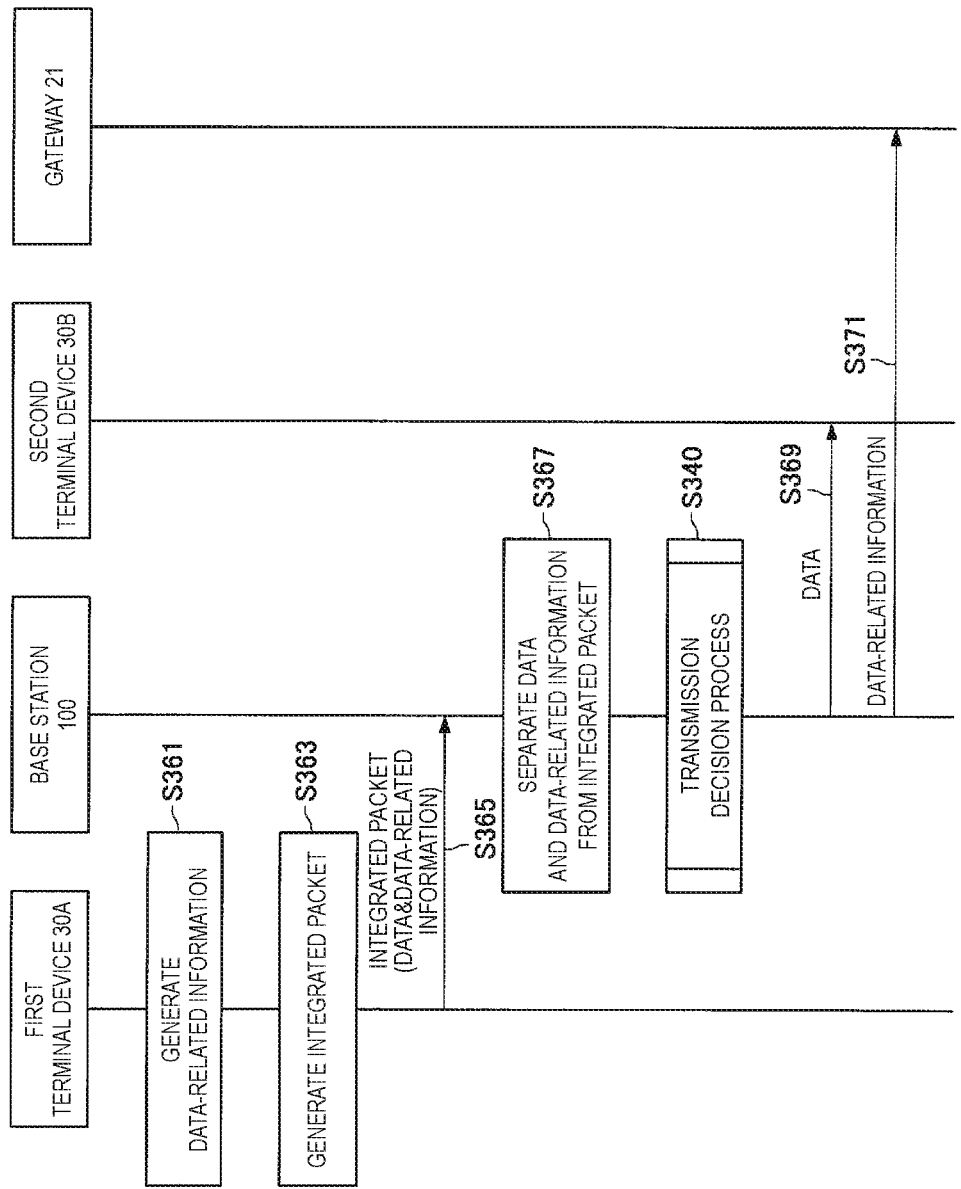
FIG. 14 is a sequence diagram illustrating a first example of a schematic flow of a process according to the modified example of the first embodiment.

FIG. 14 is a sequence diagram illustrating a first example of a schematic flow of a process according to the modified example of the first embodiment.

The first terminal device 30A generates the information related to the data destined for the second terminal device 30B (that is, the data-related information) (S361). Then, the first terminal device 30A generates the integrated packet in which the data and the data-related information are encapsulated (S363) and transmits the integrated packet to the base station 100 (S365).

Thereafter, when a predetermined indication is confirmed to be included in the integrated packet, the base station 100 separates the data and the data-related information from the integrated packet (S367).

The base station 100 performs the transmission decision process (S340). In other words, the base station 100 determines whether or not the data is able to be transferred from the first terminal device 30A to the second terminal device 30B without going through the gateway 21 and decides a node to which the data is transmitted. In this example, since the base station 100 can perform communication with the second terminal device 30B, the data is determined to be able to be transferred without going through the gateway 21, and the data is decided to be directly transmitted to the second terminal device 30B.

Thereafter, the base station 100 directly transmits the data to the second terminal device 30B (S369).

The base station 100 transmits the data-related information to the gateway 21 (S371).

The base station 100 may transmit the data-related information to the specific node instead of the gateway 21.

(Flow of Process: Second Example)

Figure 15:
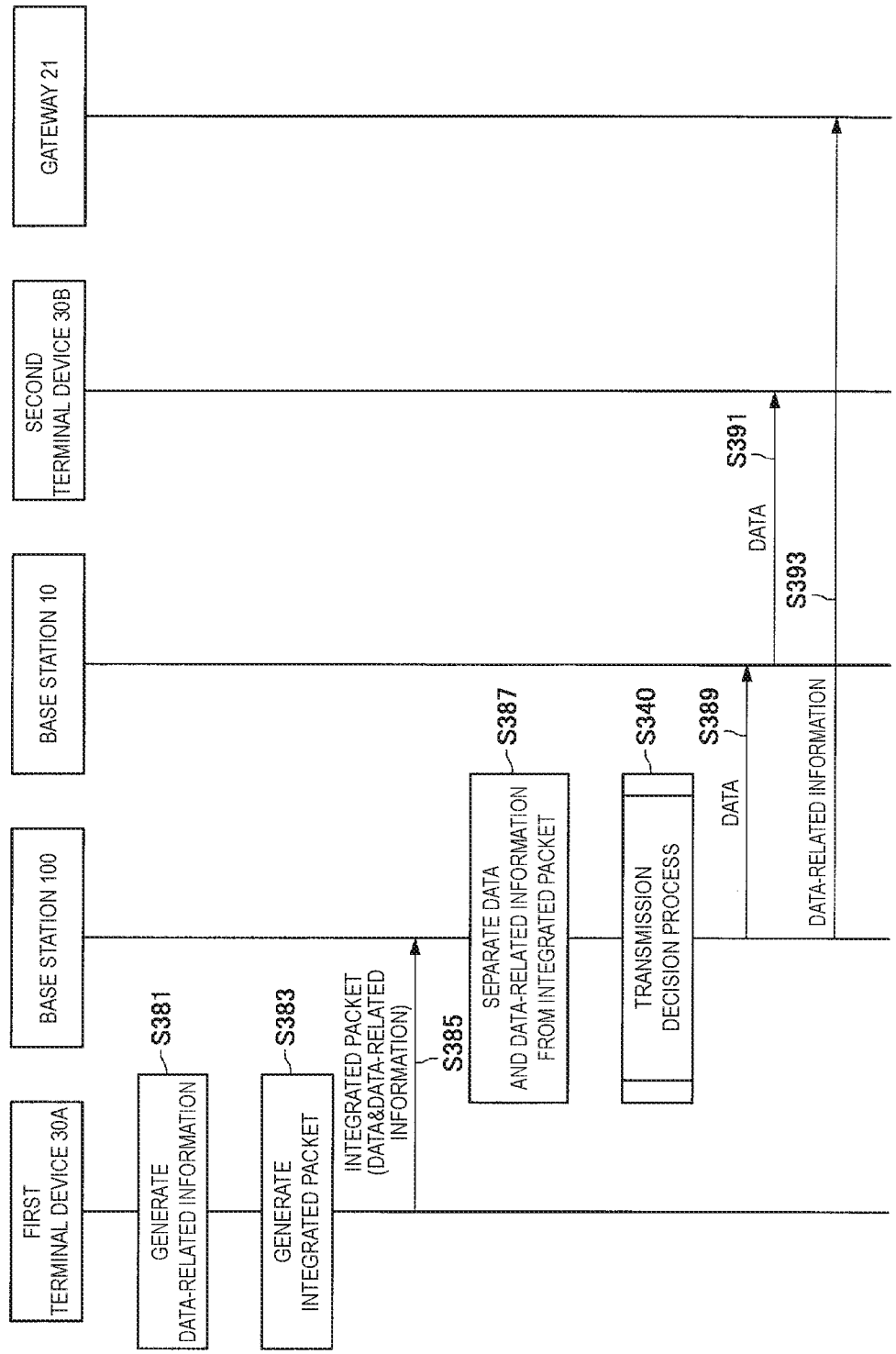
FIG. 15 is a sequence diagram illustrating a second example of a schematic flow of a process according to the modified example of the first embodiment.

FIG. 15 is a sequence diagram illustrating a second example of the schematic flow of the process according to the modified example of the first embodiment.

The first terminal device 30A generates the information related to the data destined for the second terminal device 30B (that is, the data-related information) (S381). Then, the first terminal device 30A generates the integrated packet in which the data and the data-related information are encapsulated (S383) transmits the integrated packet to the base station 100 (S385).

Thereafter, when a predetermined indication is confirmed to be included in the integrated packet, the base station 100 separates the data and the data-related information from the integrated packet (S387).

The base station 100 performs the transmission decision process (S340). In other words, the base station 100 determines whether or not the data is able to be transferred from the first terminal device 30A to the second terminal device 30B without going through the gateway 21 and decides a node to which the data is transmitted. In this example, since another base station 10 capable of receiving the data from the base station 100 without the data going through the gateway 21 can perform communication with the second terminal device 30B, the data is determined to be able to be transferred without going through the gateway 21, and the data is decided to be transmitted to another base station 10.

Thereafter, the base station 100 transmits the data to another base station 10 (S389). Then, another base station 10 transmits the data to the second terminal device 30B (S391).

The base station 100 transmits the data-related information to the gateway 21 (S393).

The base station 100 may transmit the data-related information to the specific node instead of the gateway 21.

The modified example of the first embodiment has been described above. As the modified example of the first embodiment, the example in which the first terminal device generates the data-related information, and transmits the integrated packet in which the data and the data-related information are encapsulated has been described. As the example of the first embodiment, the example in which the base station 100 generates the data-related information has been described. However, the first embodiment is not limited to this example. For example, the first terminal device may generate the data-related information and transmit the data-related information to the base station 100 separately from the data.

«2. Second Embodiment»

Next, a second embodiment of the present disclosure will be described with reference to FIGS. 16 to 27.

<2.1. Configuration of Cellular System>

Figure 16:
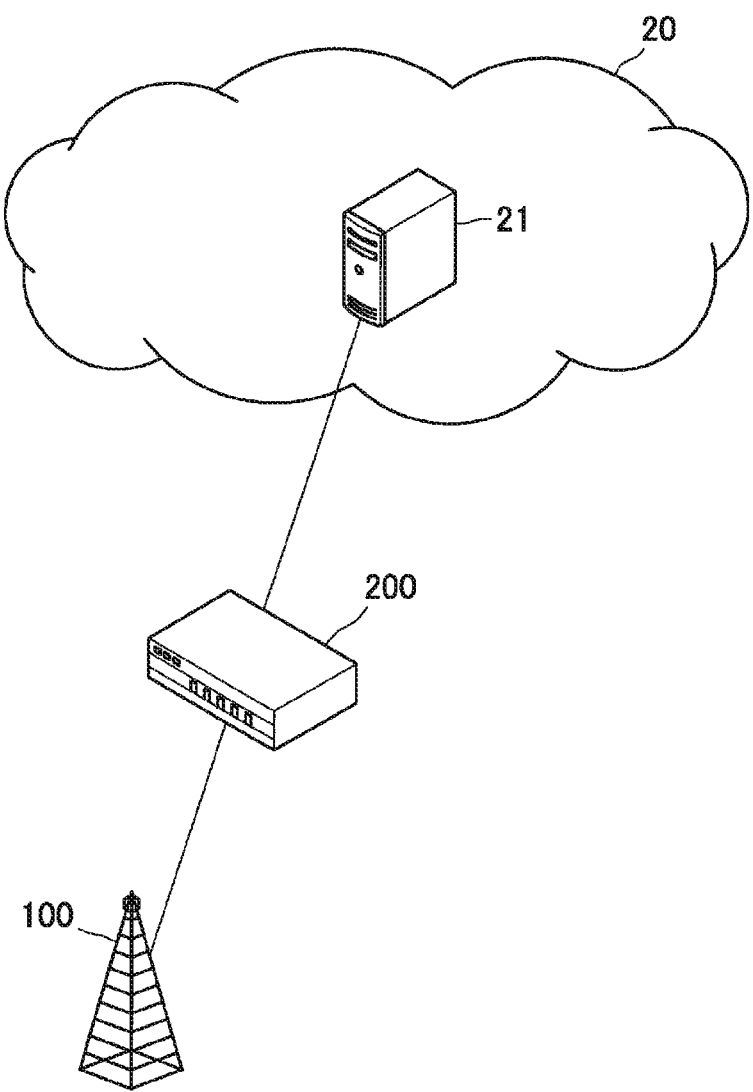
FIG. 16 is an explanatory diagram for describing an example of a schematic configuration of a cellular system according to a second embodiment.

First, a schematic configuration of a cellular system 1-2 according to the second embodiment will be described with reference to FIG. 16. FIG. 16 is an explanatory diagram for describing an example of a schematic configuration of the cellular system 1-2 according to the second embodiment Referring to FIG. 16, the cellular system 1-2 according to the second embodiment includes a base station 10, a gateway 21, and a network device 200. The cellular system 1-2 is, for example, a system that conforms to LTE, LTE-Advanced, or a communication standard equivalent thereto.

The base station 10 is a base station of the cellular system 1-2 and functions as a node of a radio access network (RAN) of the cellular system 1-2. For example, the base station 10 performs wireless communication with a terminal device located in a communication area (that is, a cell) of the base station 10. Specifically, for example, the base station 10 transmits data and control information to a terminal device and receives data and control information from a terminal device.

The gateway 21 is a gateway of the cellular system 1-2 and functions as a node of a core network (CN) of the cellular system 1-1. For example, the gateway 21 performs data transfer in the cellular system 1-2. For example, the gateway 21 performs data transfer between the base stations and performs data transfer between another gateway and the base station. Another gateway performs data transfer between the cellular system 1-2 and the external network. As an example, the gateway 21 is a serving gateway (S-GW), and the other gateway is a packet data network (PDN) gateway (P-GW).

The network device 200 is a network device of the cellular system 1-2 and functions as a node positioned between the radio access network (RAN) and the core network (CN) of the cellular system 1-2. For example, the network device 200 performs data transfer between the base station 10 and the gateway 21 and performs data transfer between the base stations 10. More specifically, for example, the network device 200 performs routing of data.

It will be appreciated that the cellular system 1-2 may include only one base station 10 or include two or more base stations 10.

According to the second embodiment, the network device 200 transmits the data so that the data destined for the second terminal device which is transmitted from the first terminal device to the base station 10 is transferred from the first terminal device to the second terminal device without going through the gateway 21. The network device 200 transmits the information related to the data to the gateway 21 or the specific node. The specific node is a node that receives the information related to other data transferred via the gateway 21 from the gateway 21.

<2.2. Configuration of Network Device>

Figure 17:
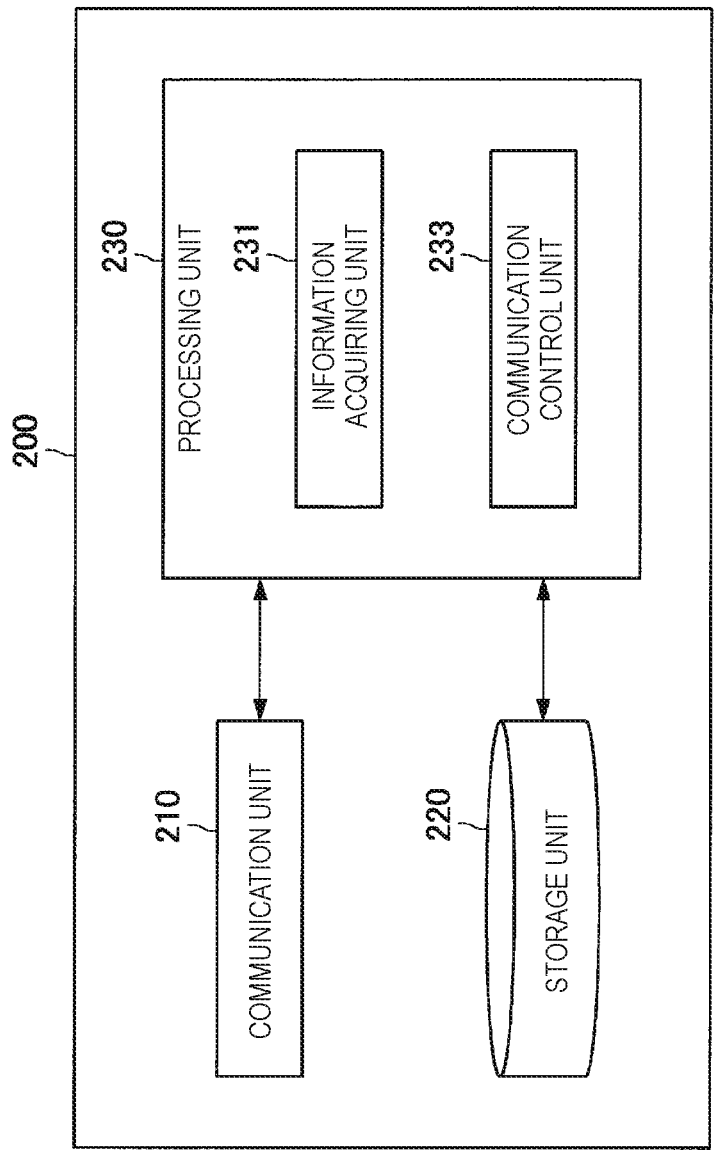
FIG. 17 is a block diagram illustrating an example of a configuration of a network device according to the second embodiment.

Next, an example of a configuration of the network device 200 according to the second embodiment will be described with reference to FIGS. 17 to 20. FIG. 17 is a block diagram illustrating an example of a configuration of the network device 200 according to the second embodiment. Referring to FIG. 17, the network device 200 includes a communication unit 210, a storage unit 220, and a processing unit 230.

(Communication Unit 210)

The communication unit 210 performs communication with another node. For example, the communication unit 210 performs communication with the base station 10. For example, the communication unit 210 performs communication with the gateway 21.

(Storage Unit 220)

The storage unit 220 temporarily or permanently stores a program and data for an operation of the network device 200).

(Processing Unit 230)

The processing unit 230 provides various functions of the network device 200. The processing unit 230 includes an information acquiring unit 231 and a communication control unit 233. The processing unit 230 may further include any other component in addition to the above-mentioned components. In other words, the processing unit 230 may also perform an operation other than operations of the above-mentioned components.

(Information Acquiring Unit 231)

The information acquiring unit 231 acquires the data destined for the second terminal device which is transmitted from the first terminal device to the base station 10.

For example, the first terminal device transmits the data to the base station 10. Then, the base station 10 receives the data, and transmits the data to the gateway 21. The network device 200 receives the data to be transmitted to the gateway, and stores the data in the storage unit 220. Thereafter, at any timing, the information acquiring unit 231 acquires the data from the storage unit 220.

(Communication Control Unit 233)

(a) Transmission of Data

The communication control unit 233 controls transmission of the data (that is, the data destined for the second terminal device which is transmitted from the first terminal device to the base station 10).

Transfer of Data without Going Through Gateway 21

Particularly, in the second embodiment, the communication control unit 233 controls transmission of the data such that the data is transferred from the first terminal device to the second terminal device without going through the gateway 21.

Condition

For example, when the condition for the transfer from the first terminal device to the second terminal device is satisfied, the communication control unit 233 performs control of transmission of the data such that the data is transferred from the first terminal device to the second terminal device without going through the gateway 21.

Regarding this point, there is no difference between the first embodiment and the second embodiment except that the main entity in the first embodiment is the base station 100, and the main entity in the second embodiment is the network device 200. Thus, a duplicated description is omitted here.

Specific Example of Transmission

For example, when the base station 10 capable of receiving the data from the network device 200 without the data going through the gateway 21 can perform communication with the second terminal device, the network device 200 transmits the data destined for the second terminal device to the base station 10. The base station 10 may be the base station 10 that has received the data. Alternatively, the base station 10 may be a second base station 10B different from a first base station 10A that has received the data.

Specific Example of Transmission Control

For example, when the base station 10 capable of receiving the data from the network device 200 without the data going through the gateway 21 can perform communication with the second terminal device, the communication control unit 153 generates a packet destined for the base station 10 including the data destined for the second terminal device, and causes the communication unit 210 to transmit the packet.

Transfer of Data Via the Gateway 21

It will be appreciated that the communication control unit 233 may control transmission of the data such that the data is transferred from the first terminal device to the second terminal device via the gateway 21.

Condition

For example, when the condition for the transfer from the first terminal device to the second terminal device is not satisfied, the communication control unit 233 may control transmission of the data such that the data is transferred from the first terminal device to the second terminal device via the gateway 21.

Specific Example of Transmission

The network device 200 transmits the data destined for the second terminal device to the gateway 21.

Specific Example of Transmission Control

The communication control unit 233 generates the packet destined for the gateway 21 including the data destined for the second terminal device, and causes the communication unit 210 to transmit the packet.

(b) Transmission of Data-related Information

As described above, for example, the communication control unit 233 controls transmission of the data such that the data (that is, the data destined for the second terminal device which is transmitted from the first terminal device to the base station 100) is transferred from the first terminal device to the second terminal device without going through the gateway 21. In this case, the communication control unit 233 controls transmission of the information related to the data (that is, the data-related information) to the gateway 21 or the specific node. In other words, through control by the communication control unit 233, the network device 200 transmits the data-related information to the gateway 21 or the specific node.

Data Serving as Target

For example, the data-related information is information related to data of packet units. Alternatively, the data-related information may be information related to data of session units. Regarding this point, there is no difference between the first embodiment and the second embodiment. Thus, a duplicated description is omitted here.

Data-related Information

There is no difference in content of the data-related information between the first embodiment and the second embodiment. Thus, a duplicated description is omitted here.

Technique of Acquiring Data-related Information

For example, the communication control unit 233 generates the data-related information. Then, the communication control unit 233 acquires the generated data-related information.

Accordingly, for example, the gateway 21 or the specific node can acquire the data-related information without adding a new function to the terminal device, the base station, or the like.

Transmission Destination of Data-related Information

Gateway 21

For example, the communication control unit 233 controls transmission of the data-related information to the gateway 21. In other words, through control by the communication control unit 233, the network device 200 transmits the data-related information to the gateway 21. Regarding this point, a specific example will be described below with reference to FIGS. 18 and 19.

Figure 18:
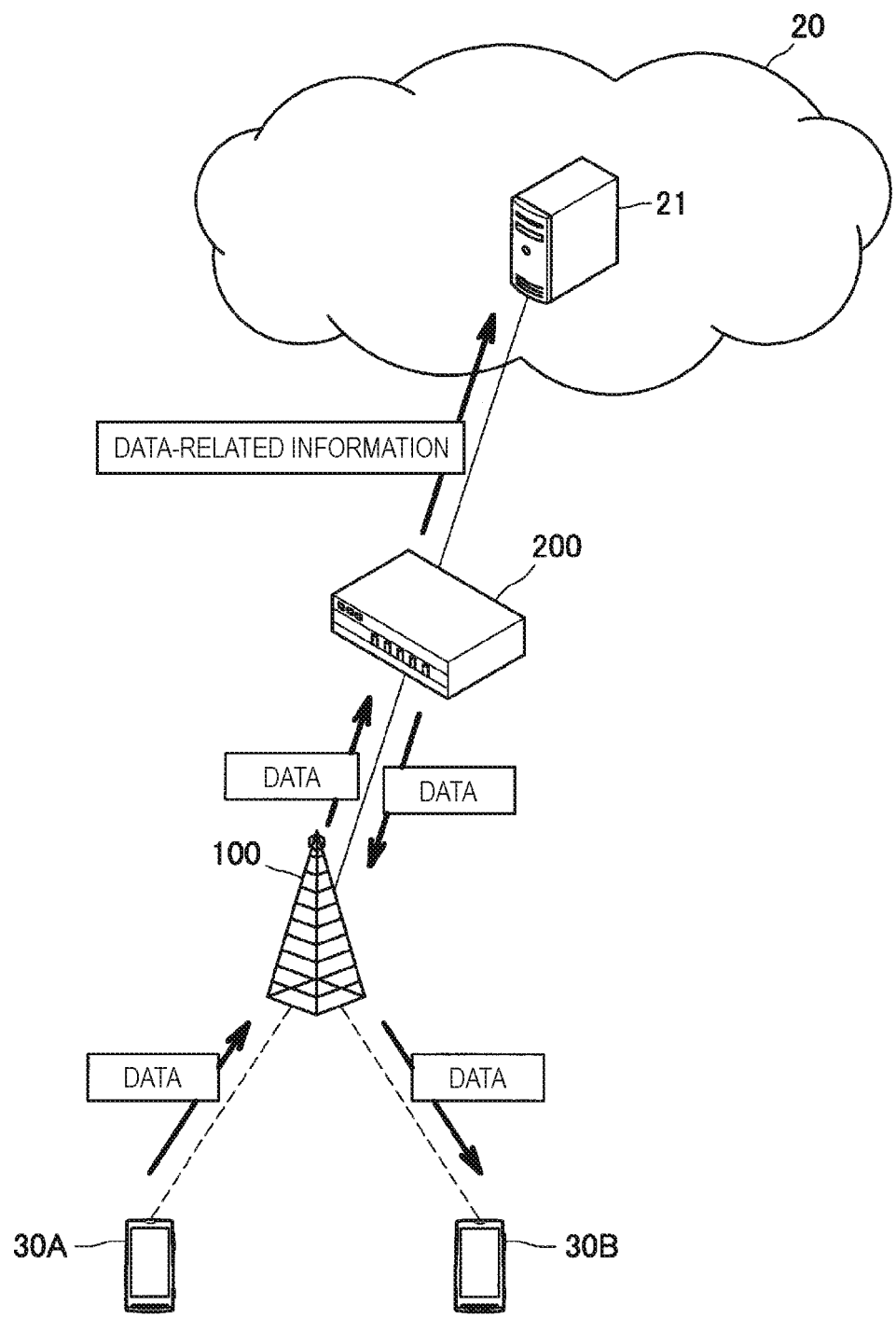
FIG. 18 is an explanatory diagram for describing a first example of transmission of data-related information according to the second embodiment.

FIG. 18 is an explanatory diagram for describing a first example of transmission of the data-related information according to the second embodiment. Referring to FIG. 18, the base station 10, the gateway 21, the first terminal device 30A, the second terminal device 30B, and the network device 200 are illustrated. The first terminal device 30A transmits the data destined for the second terminal device 30B to the base station 10. Then, the base station 10 transmits the data to the gateway 21, and the network device 200 receives the data. In this example, since the base station 10 can perform communication with the second terminal device 30B, the network device 200 transmits the data to the base station 10. Then, the base station 10 transmits the data to the second terminal device 30B. The network device 200 transmits the information related to the data (that is, the data-related information) to the gateway 21.

Figure 19:
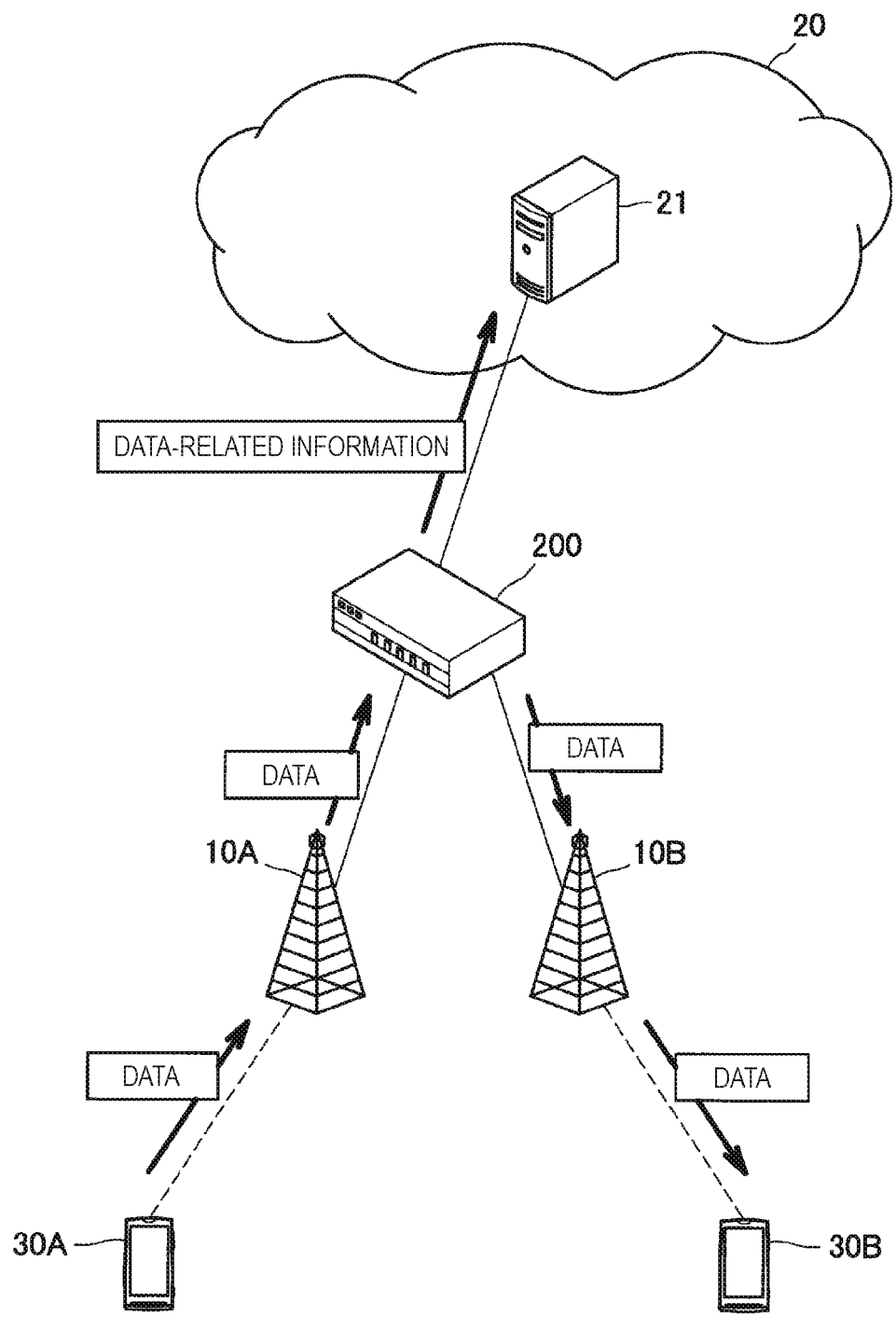
FIG. 19 is an explanatory diagram for describing a second example of transmission of data-related information according to the second embodiment.

FIG. 19 is an explanatory diagram for describing a second example of transmission of the data-related information according to the second embodiment. Referring to FIG. 19, the first base station 10A, the second base station 10B, the gateway 21, the first terminal device 30A, the second terminal device 30B, and the network device 200 are illustrated. The first terminal device 30A transmits the data destined for the second terminal device 30B to the first base station 10A. Then, the first base station 10A transmits the data to the gateway 21, and the network device 200 receives the data. In this example, since the second base station 10B capable of receiving the data from the network device 200 without the data going through the gateway 21 can perform communication with the second terminal device 30B, the network device 200 transmits the data to the second base station 10B. Then, the second base station 10B transmits the data to the second terminal device 30B. The network device 200 transmits the information related to the data (that is, the data-related information) to the gateway 21.

Accordingly, for example, the gateway 21 can acquire the information related to the data transferred without going through the gateway 21. For this reason, the gateway 21 can transmit the information related to both of the data transferred via the gateway 21 and the data transferred without going through the gateway 21 to the specific node (for example, the node having the PCRF or the like).

Specific Node

Alternatively, the communication control unit 233 may control transmission of the data-related information to the specific node. In other words, through control by the communication control unit 233, the network device 200 may transmit the data-related information to the specific node. The specific node is a node that receives the information related to other data transferred via the gateway 21 (that is, other data-related information) from the gateway 21. As an example, the specific node is the node having the PCRF. Regarding this point, a specific example will be described below with reference to FIG. 20.

Figure 20:
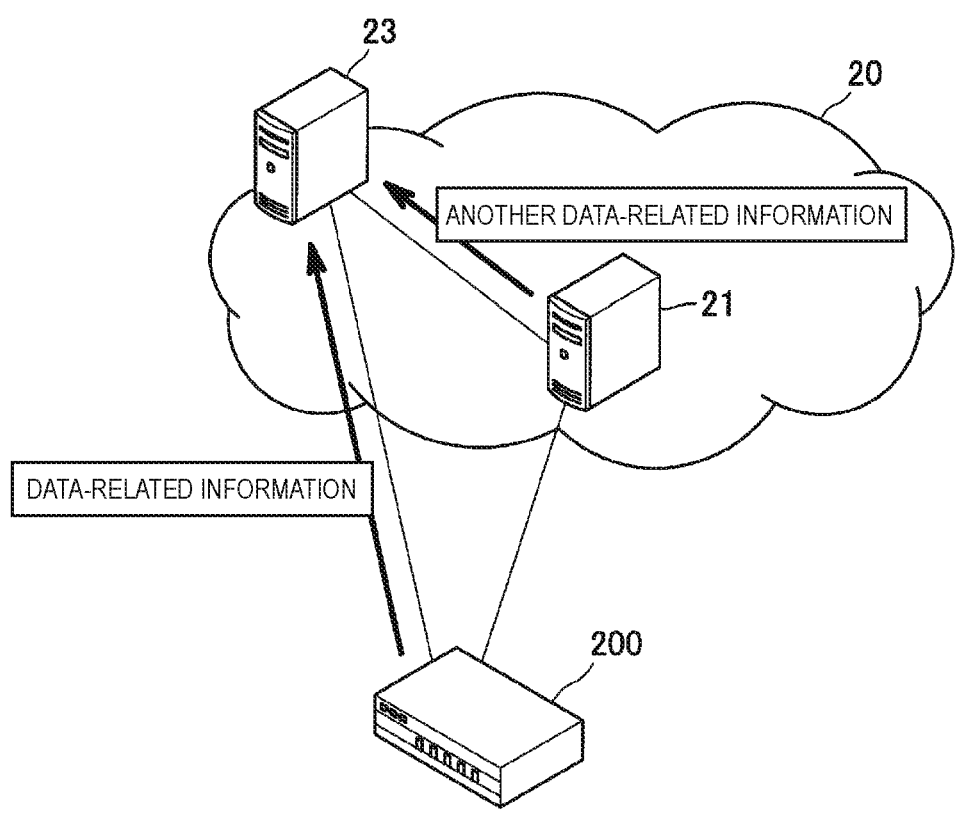
FIG. 20 is an explanatory diagram for describing a third example of transmission of data-related information according to the second embodiment.

FIG. 20 is an explanatory diagram for describing a third example of transmission of the data-related information according to the second embodiment. Referring to FIG. 20, the network device 200, the gateway 21, and the specific node 23 are illustrated. In this example, similarly to the examples illustrated in FIGS. 18 and 19, data is transferred from the first terminal device to the second terminal device without going through the gateway 21. Particularly, in this example, the network device 200 transmits the information related to the data (that is, the data-related information) to the specific node 23. The gateway 21 transmits the information related to other data transferred via the gateway 21 (that is, other data-related information) to the specific node 23.

Accordingly, for example, the specific node can acquire the information related to the data transferred via the gateway 21 (that is, other data-related information) and the information related to the data transferred without going through the gateway 21 (that is, the data-related information).

Specific Example of Transmission Control

As described above, for example, the communication control unit 233 controls transmission of the data-related information to the gateway 21. In this case, the communication control unit 233 generates the packet destined for the gateway 21 including the data-related information, and causes the communication unit 210 to transmit the packet.

Alternatively, the communication control unit 233 may control transmission of the data-related information to the specific node as described above. In this case, the communication control unit 233 may generate the packet destined for the specific node including the data-related information and cause the communication unit 210 to transmit the packet.

The configuration of the network device 200 according to the second embodiment has been described above. As described above, the information acquiring unit 231 acquires the data destined for the second terminal device which is transmitted from the first terminal device to the base station 100. The communication control unit 233 controls transmission of the data such that the data is transferred from the first terminal device to the second terminal device without going through the gateway 21. The communication control unit 233 controls transmission of the information related to the data (that is, the data-related information) to the gateway 21 or the specific node. Accordingly, for example, it is possible to perform management related to transmission and reception of data while reducing the load on the core network. More specifically, for example, since data is transferred without going through the gateway 21, the load on the gateway 21 from transfer of data is reduced. Further, since the data-related information is transmitted to the gateway 21 or the specific node, it is also possible to perform management related to transmission and reception of data without going through the gateway 21. Furthermore, a delay related to data transfer can be reduced.

<2.3. Flow of Process>

Next, an example of a process according to the second embodiment will be described with reference to FIGS. 21 to 23.

First Example

Figure 21:
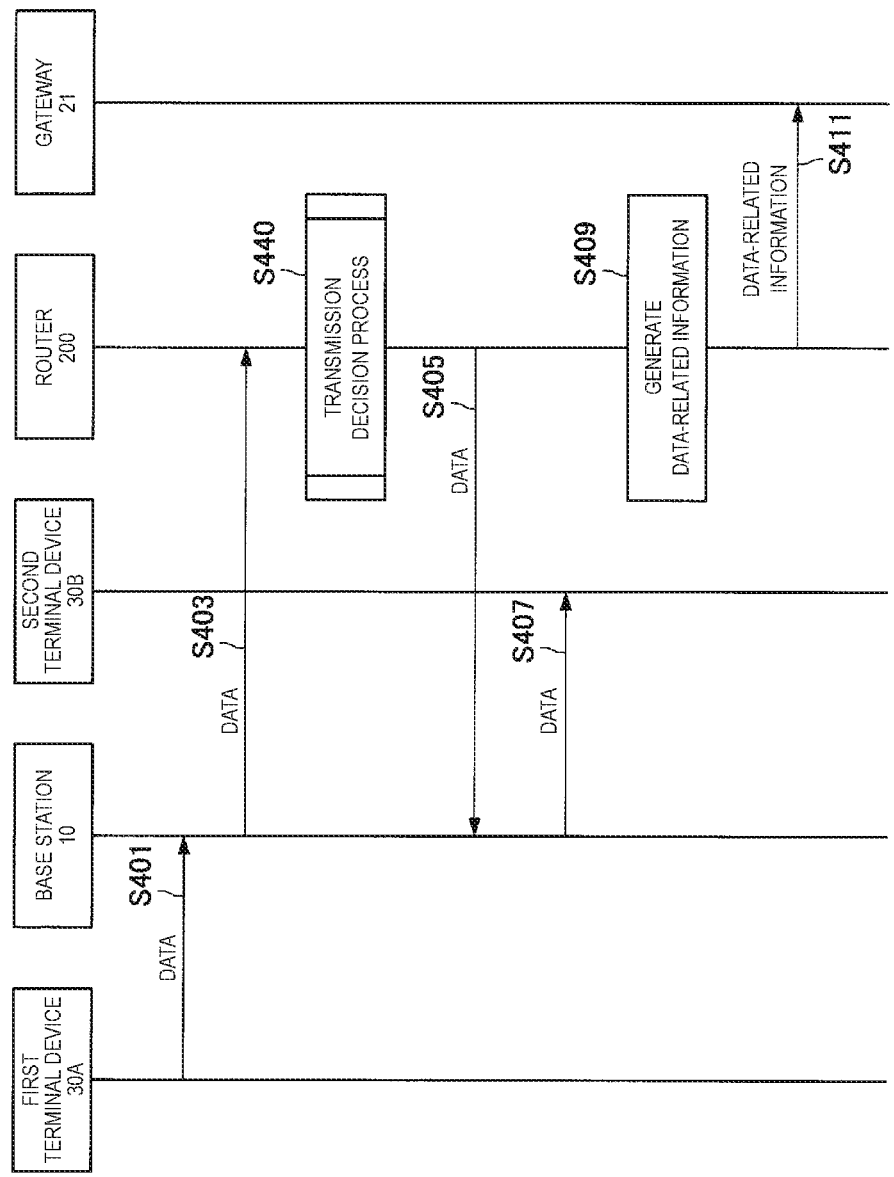
FIG. 21 is a sequence diagram illustrating a first example of a schematic flow of a process according to the second embodiment.
Figure 22:
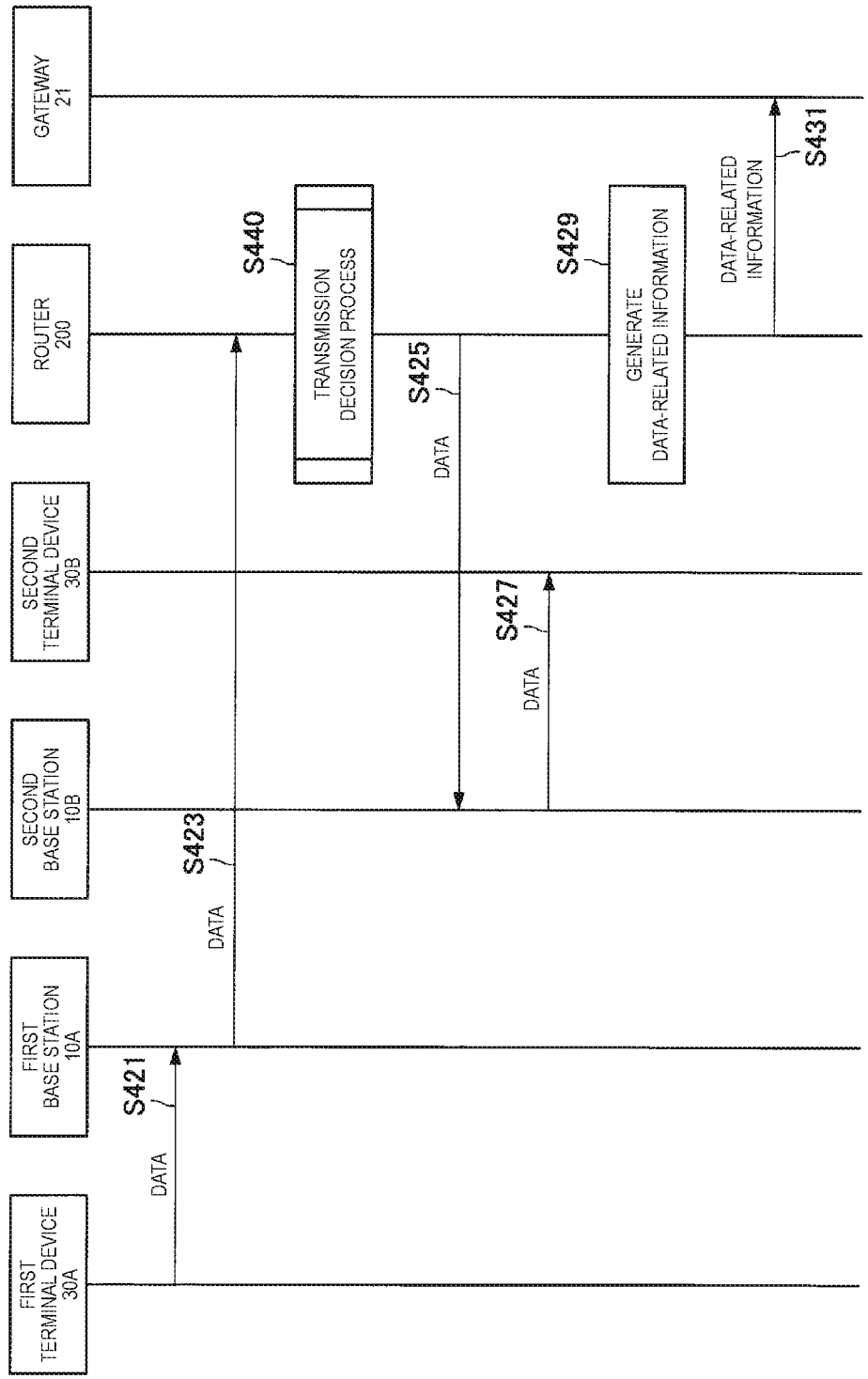
FIG. 22 is a sequence diagram illustrating a second example of a schematic flow of a process according to the second embodiment.

FIG. 21 is a sequence diagram illustrating a first example of a schematic flow of a process according to the second embodiment.

The first terminal device 30A transmits the data destined for the second terminal device 30B to the base station 10 (S401).

Then, the base station 10 transmits the data to the gateway 21, and the network device 200 receives the data (S403).

Then, the network device 200 performs the transmission decision process (S440). In other words, the network device 200 determines whether or not the data is able to be transferred from the first terminal device 30A to the second terminal device 30B without going through the gateway 21 and decides a node to which the data is transmitted. In this example, since the base station 10 can perform communication with the second terminal device 30B, the data is determined to be able to be transferred without going through the gateway 21, and the data is decided to be transmitted to the base station 10.

Thereafter, the network device 200 transmits the data to the base station 10 (S405). Then, the base station 10 transmits the data to the second terminal device 30B (S407).

The network device 200 generates the information related to the data (that is, the data-related information) (S409). Then, the network device 200 transmits the data-related information to the gateway 21 (S411).

The network device 200 may transmit the data-related information to the specific node instead of the gateway 21.
Second Example FIG. 22 is a sequence diagram illustrating a second example of the schematic flow of the process according to the second embodiment.

The first terminal device 30A transmits the data destined for the second terminal device 30B to the first base station 10A (S421).

Then, the first base station 10A transmits the data to the gateway 21, and the network device 200 receives the data (S403).

Then, the network device 200 performs the transmission decision process (S440). In other words, the network device 200 determines whether or not the data is able to be transferred from the first terminal device 30A to the second terminal device 30B without going through the gateway 21 and decides a node to which the data is transmitted. In this example, since the second base station 10B can perform communication with the second terminal device 30B, the data is determined to be able to be transferred without going through the gateway 21, and the data is decided to be transmitted to the second base station 10B.

Thereafter, the network device 200 transmits the data to the second base station 10B (S425). Then, the second base station 10B transmits the data to the second terminal device 30B (S427).

The network device 200 generates the information related to the data (that is, the data-related information) (S429). Then, the network device 200 transmits the data-related information to the gateway 21 (S431).

The network device 200 may transmit the data-related information to the specific node instead of the gateway 21.
(Transmission Decision Process)

Figure 23:
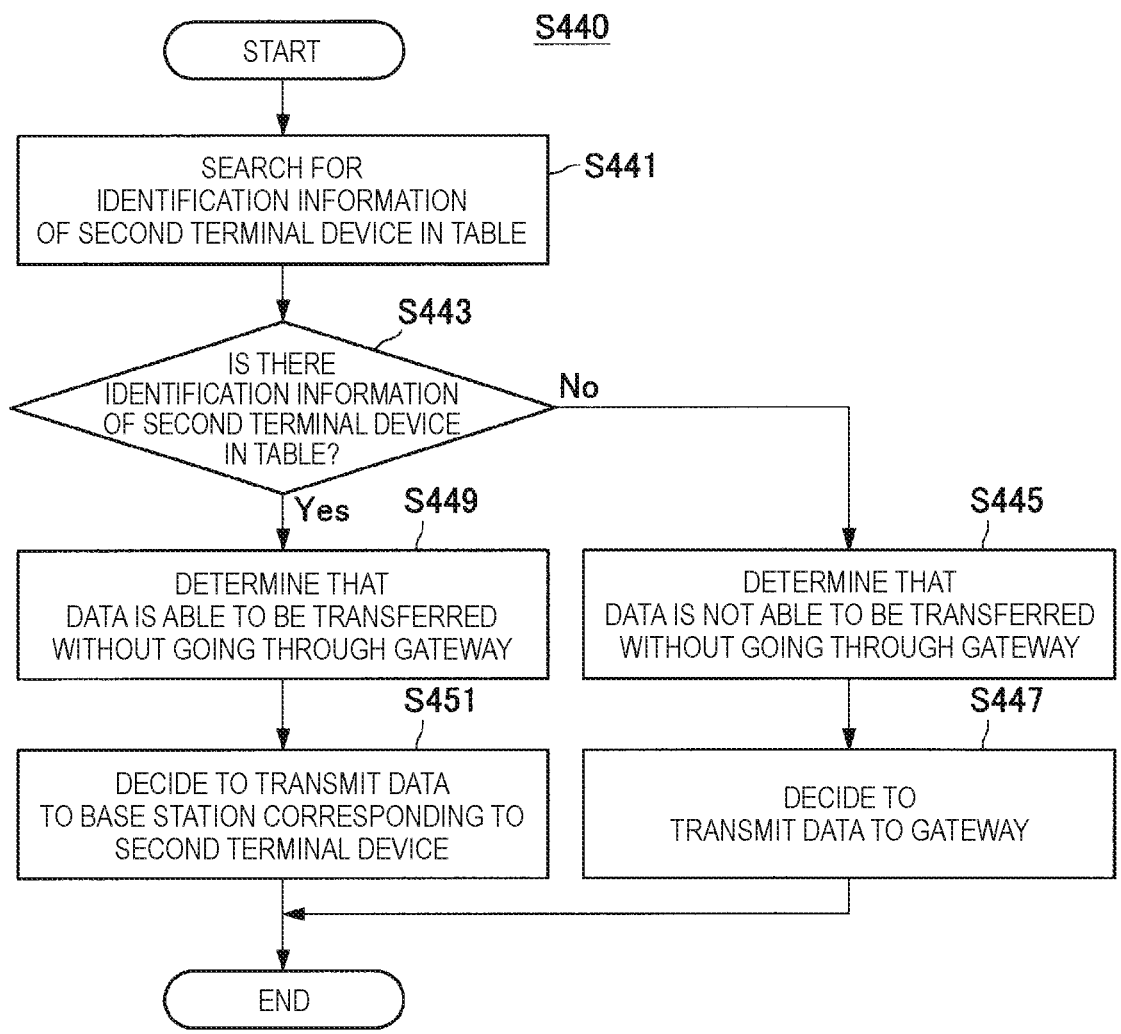
FIG. 23 is a flowchart illustrating an example of a schematic flow of a transmission decision process according to the second embodiment.

FIG. 23 is a flowchart illustrating an example of a schematic flow of a transmission decision process according to the second embodiment.

The communication control unit 233 searches for the identification information of the second terminal device 30B in the table stored in the storage unit 220 (S441).

When there is no identification information of the second terminal device 30B in the table (NO in S443), the communication control unit 233 determines that the data destined for the second terminal device 30B is not able to be transferred without going through the gateway 21 (S445). Then, the communication control unit 233 decides to transmit the data to the gateway 21 (S447). Then, the process ends.

On the other hand, when the identification information of the second terminal device 30B is in the table (YES in S443), the communication control unit 233 determines that the data destined for the second terminal device 30B is able to be transferred without going through the gateway 21 (S449). Then, the communication control unit 233 decides to transmit the data to the base station 10 corresponding to the second terminal device 30B in the table (S451). Then, the process ends.

<2.4. Modified Example>

Next, a modified example of the second embodiment will be described with reference to FIGS. 24 to 27.

In the example of the second embodiment, the network device 200 (the communication control unit 233) generates the data-related information. On the other hand, in the modified example of the second embodiment, the first terminal device or the base station 10 generates the data-related information, and transmits the integrated packet in which the data and the data-related information are encapsulated. Then, the network device 200 separates the data and the data-related information from the integrated packet.

Accordingly, for example, the load on the network device 200 can be reduced.
(Network Device 200: Information Acquiring Unit 231)

In the modified example of the first embodiment, the information acquiring unit 231 acquires the integrated packet in which the data and the data-related information are encapsulated, and separates the data and the data-related information from the integrated packet.

Specifically, for example, the first terminal device generates the data-related information, and generates the integrated packet in which the data and the data-related information are encapsulated. Then, the first terminal device transmits the integrated packet to the base station 10. Thereafter, the base station 10 transmits the integrated packet to the gateway 21, and the network device 200 receives the integrated packet. Then, the information acquiring unit 231 acquires the integrated packet, and separates the data and the data-related information from the integrated packet. Accordingly, the information acquiring unit 231 acquires the data and the data-related information.

Rather than the first terminal device, the base station 10 that receives the data from the first terminal device may generate the data-related information and generate the integrated packet in which the data and the data-related information are encapsulated. Then, the base station 10 may transmit the integrated packet to the gateway 21, and the network device 200 may receive the integrated packet.

For example, the integrated packet includes predetermined indication information indicating that the data and the data-related information are encapsulated in the integrated packet. In this case, when the packet (that is, the integrated packet) including the predetermined indication information is acquired, the information acquiring unit 231 separates the data and the data-related information from the packet. Accordingly, for example, the load on the network device 200 can be further reduced.
(Network Device 200: Communication Control Unit 233)
(b) Transmission of Data-related Information
Technique of Acquiring Data-Related Information In the modified example of the second embodiment, since the information acquiring unit 231 acquires the data-related information as described above, the communication control unit 233 does not generate the data-related information.
(Specific Example of Transmission of Data and Data-related Information)

Figure 24:
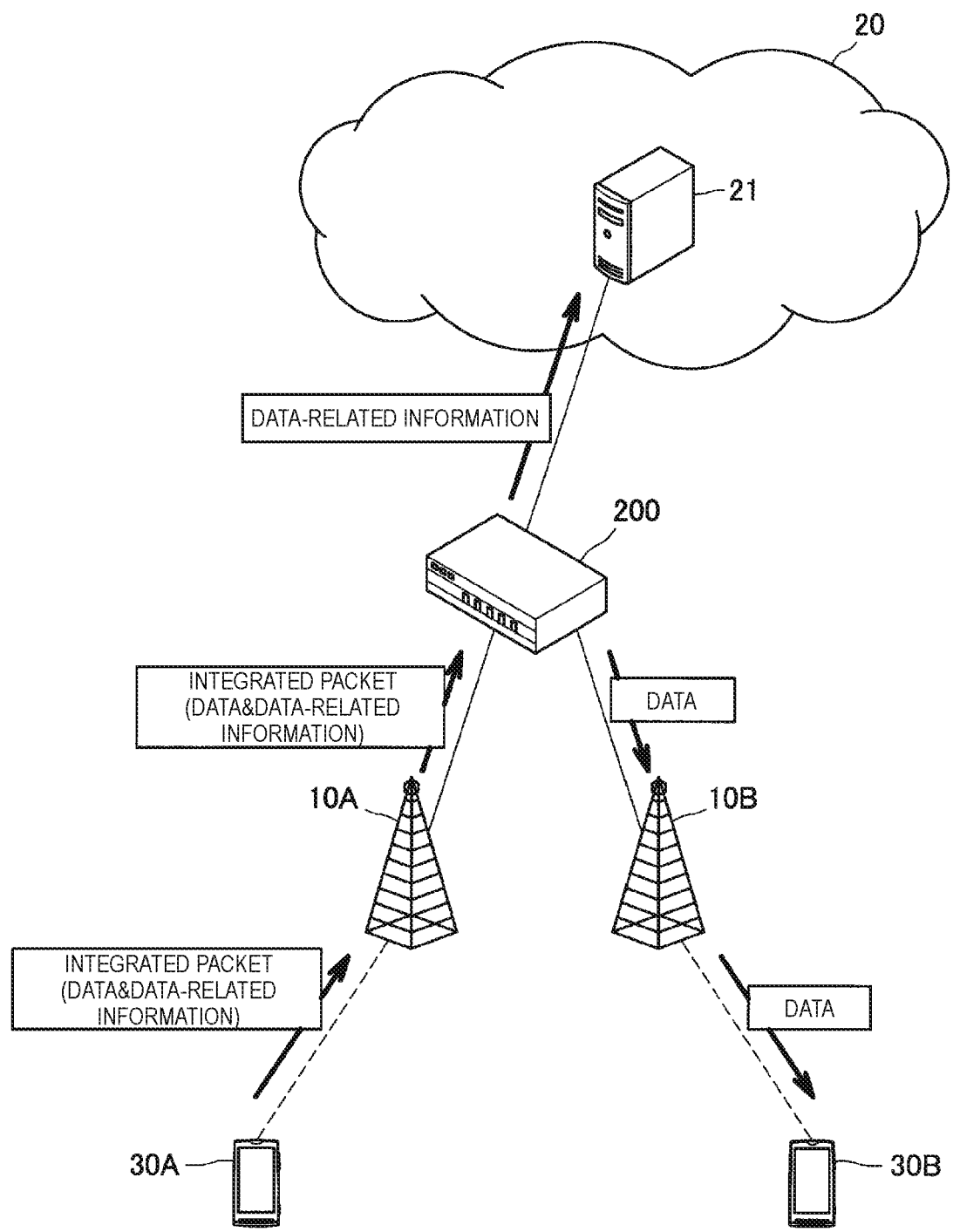
FIG. 24 is an explanatory diagram for describing a first example of transmission of data and data-related information according to a modified example of the second embodiment.

FIG. 24 is an explanatory diagram for describing a first example of transmission of the data and the data-related information according to the modified example of the second embodiment. Referring to FIG. 24, the first base station 10A, the second base station 10B, the gateway 21, the first terminal device 30A, the second terminal device 30B, and the network device 200 are illustrated. The first terminal device 30A transmits the integrated packet in which the data and the data-related information are encapsulated to the first base station 10A. Then, the first base station 10A transmits the integrated packet to the gateway 21, and the network device 200 receives the integrated packet. Then, the network device 200 separates the data and the data-related information from the integrated packet. In this example, since the second base station 10B can perform communication with the second terminal device 30B, the network device 200 transmits the data to the second base station 10B. Then, the second base station 10B transmits the data to the second terminal device 30B. The network device 200 transmits the data-related information to the gateway 21.

Figure 25:
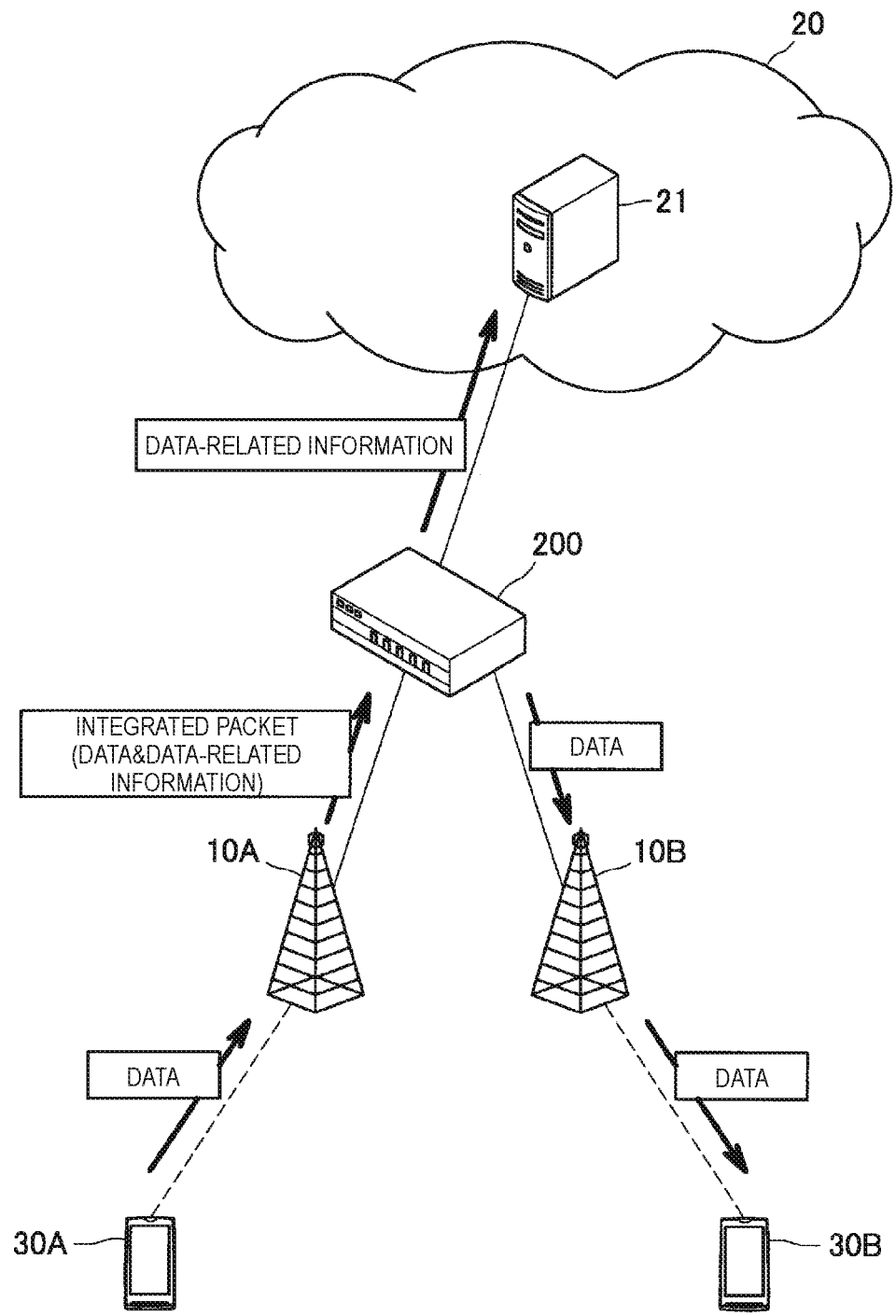
FIG. 25 is an explanatory diagram for describing a second example of transmission of data and data-related information according to a modified example of the second embodiment.

FIG. 25 is an explanatory diagram for describing a second example of transmission of the data and the data-related information according to the modified example of the second embodiment. Referring to FIG. 25, the first base station 10A, the second base station 10B, the gateway 21, the first terminal device 30A, the second terminal device 30B, and the network device 200 are illustrated. The first terminal device 30A transmits the data to the first base station 10A. Then, the first base station 10A generates the data-related information, and transmits the integrated packet in which the data and the data-related information are encapsulated to the gateway 21, and the network device 200 receives the integrated packet. Then, the network device 200 separates the data and the data-related information from the integrated packet. In this example, since the second base station 10B can perform communication with the second terminal device 30B, the network device 200 transmits the data to the second base station 10B. Then, the second base station 10B transmits the data to the second terminal device 30B. The network device 200 transmits the data-related information to the gateway 21.

In the examples illustrated in FIGS. 24 and 25, the second base station 10B can perform communication with the second terminal device 30B, but the modified example of the second embodiment is not limited to the relevant example. For example, the first base station 10A can perform communication with the second terminal device 30B, and the network device 200 may transmit the data to the first base station 10A.

In the examples illustrated in FIGS. 24 and 25, the network device 200 transmits the data-related information to the gateway 21, but the modified example of the second embodiment is not limited to the relevant example. For example, the network device 200 may transmit the data-related information to the specific node instead of the gateway 21.

(Flow of Process: First Example)

Figure 26:
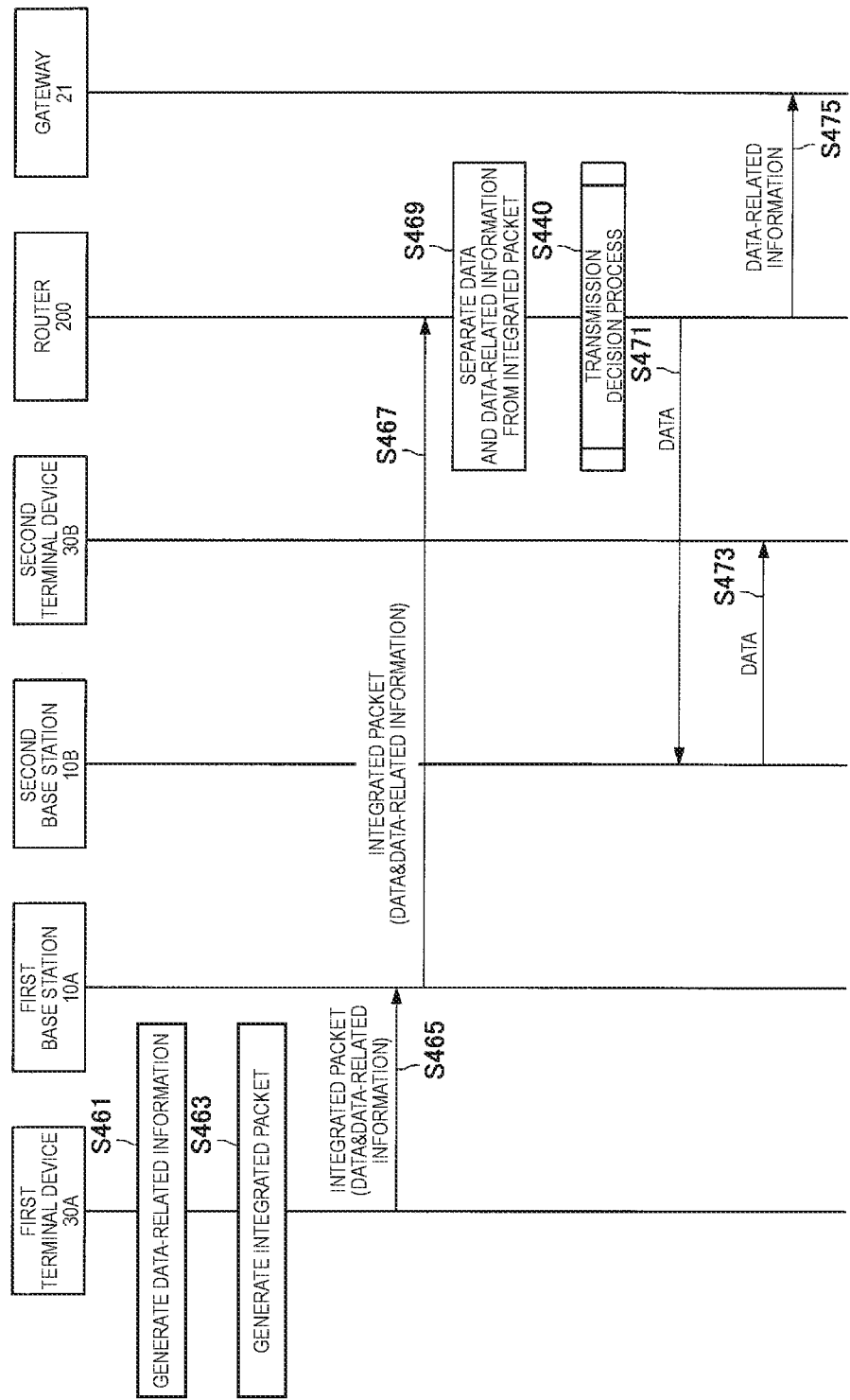
FIG. 26 is a sequence diagram illustrating a first example of a schematic flow of a process according to the modified example of the second embodiment.
Figure 27:
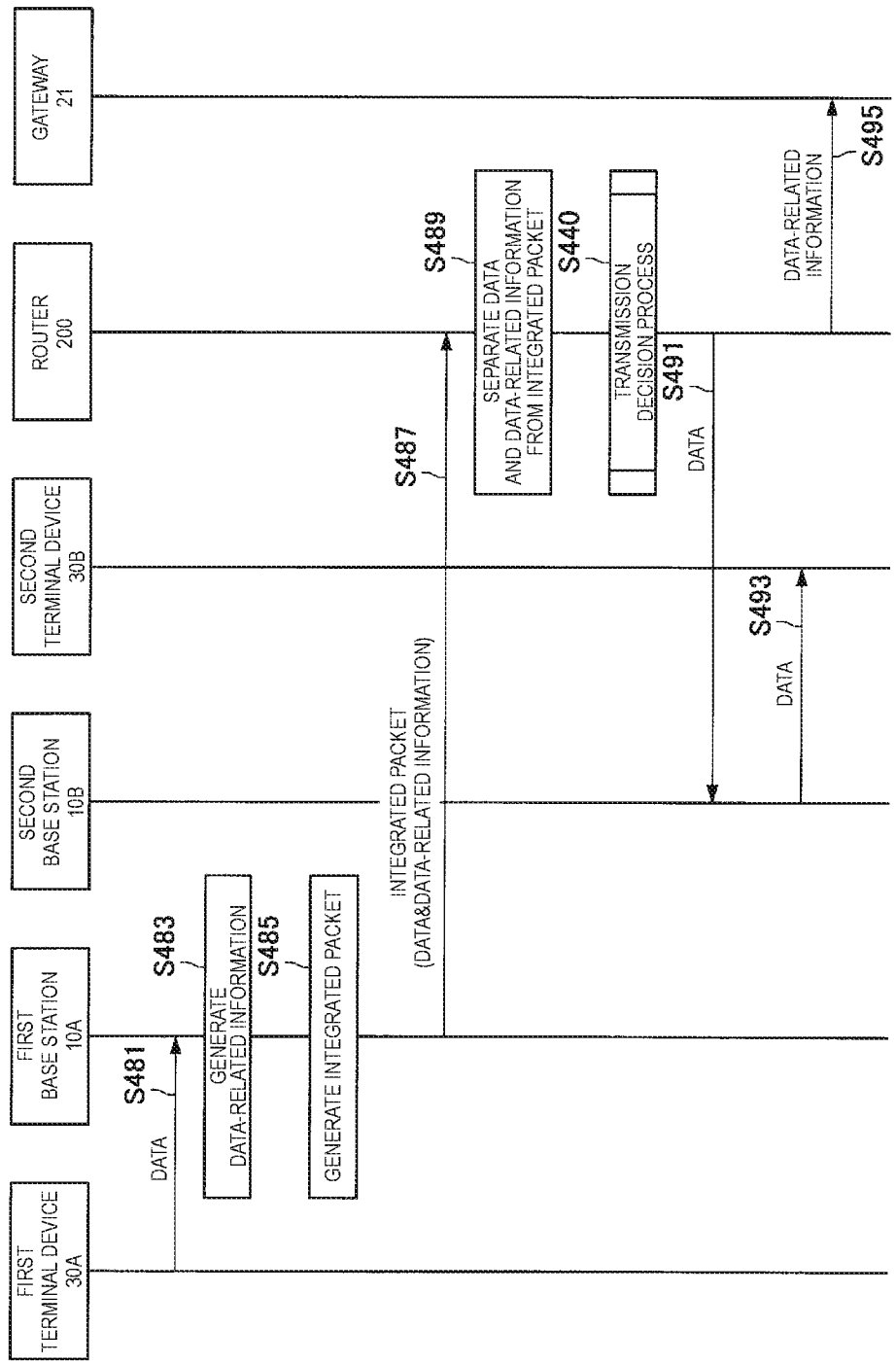
FIG. 27 is a sequence diagram illustrating a second example of a schematic flow of a process according to the modified example of the second embodiment.

FIG. 26 is a sequence diagram illustrating a first example of a schematic flow of a process according to the modified example of the second embodiment.

The first terminal device 30A generates the information related to the data destined for the second terminal device 30B (that is, the data-related information) (S461). Then, the first terminal device 30A generates the integrated packet in which the data and the data-related information are encapsulated (S463), and transmits the integrated packet to the first base station 10A (S465).

Then, the first base station 10A transmits the integrated packet to the gateway 21, and the network device 200 receives the integrated packet (S467).

Thereafter, when a predetermined indication is confirmed to be included in the integrated packet, the network device 200 separates the data and the data-related information from the integrated packet (S469).

The network device 200 performs the transmission decision process (S440). In other words, the network device 200 determines whether or not the data is able to be transferred from the first terminal device 30A to the second terminal device 30B without going through the gateway 21 and decides a node to which the data is transmitted. In this example, since the second base station 10B capable of receiving the data from the network device 200 without the data going through the gateway 21 can perform communication with the second terminal device 30B, the data is determined to be able to be transferred without going through the gateway 21, and the data is decided to be transmitted to the second base station 10B.

Thereafter, the network device 200 transmits the data to the second base station 10B (S471). Then, the second base station 10B transmits the data to the second terminal device 30B (S473).

The network device 200 transmits the data-related information to the gateway 21 (S475).

The base station 100 may transmit the data-related information to the specific node instead of the gateway 21.

The second terminal device 30B may perform communication with the first base station 10A, and in this case, the data may be transmitted from the network device 200 to the first base station 10A and then transmitted from the first base station 10A to the second terminal device 30B.

(Flow of Process: Second Example)

FIG. 26 is a sequence diagram illustrating a second example of the schematic flow of the process according to the modified example of the second embodiment. A description of steps S489 to S495 in the second example is the same as the description of steps S469 to S475 in the first example described above with reference to FIG. 26. Thus, only steps S481 to S487 will be described here.

The first terminal device 30A transmits the data destined for the second terminal device 30B to the first base station 10A (S481).

Then, the first base station 10A generates the information related to the data destined for the second terminal device 30B (that is, the data-related information) (S483). Then, the first base station 10A generates the integrated packet in which the data and the data-related information are encapsulated (S485).

Then, the first base station 10A transmits the integrated packet to the gateway 21, and the network device 200 receives the integrated packet (S487).

The modified example of the second embodiment has been described above. As the modified example of the second embodiment, the example in which the first terminal device or the base station 10 generates the data-related information, and transmits the integrated packet in which the data and the data-related information are encapsulated has been described. As an example of the second embodiment, the example in which the network device 200 generates the data-related information has been described. However, the second embodiment is not limited to these examples. For example, the first terminal device or the base station 10 may generate the data-related information and transmit the data-related information separately from the data.

«3. Third Embodiment»

Next, a third embodiment of the present disclosure will be described with reference to FIGS. 28 to 36.

<3.1. Configuration of Cellular System>

Figure 28:
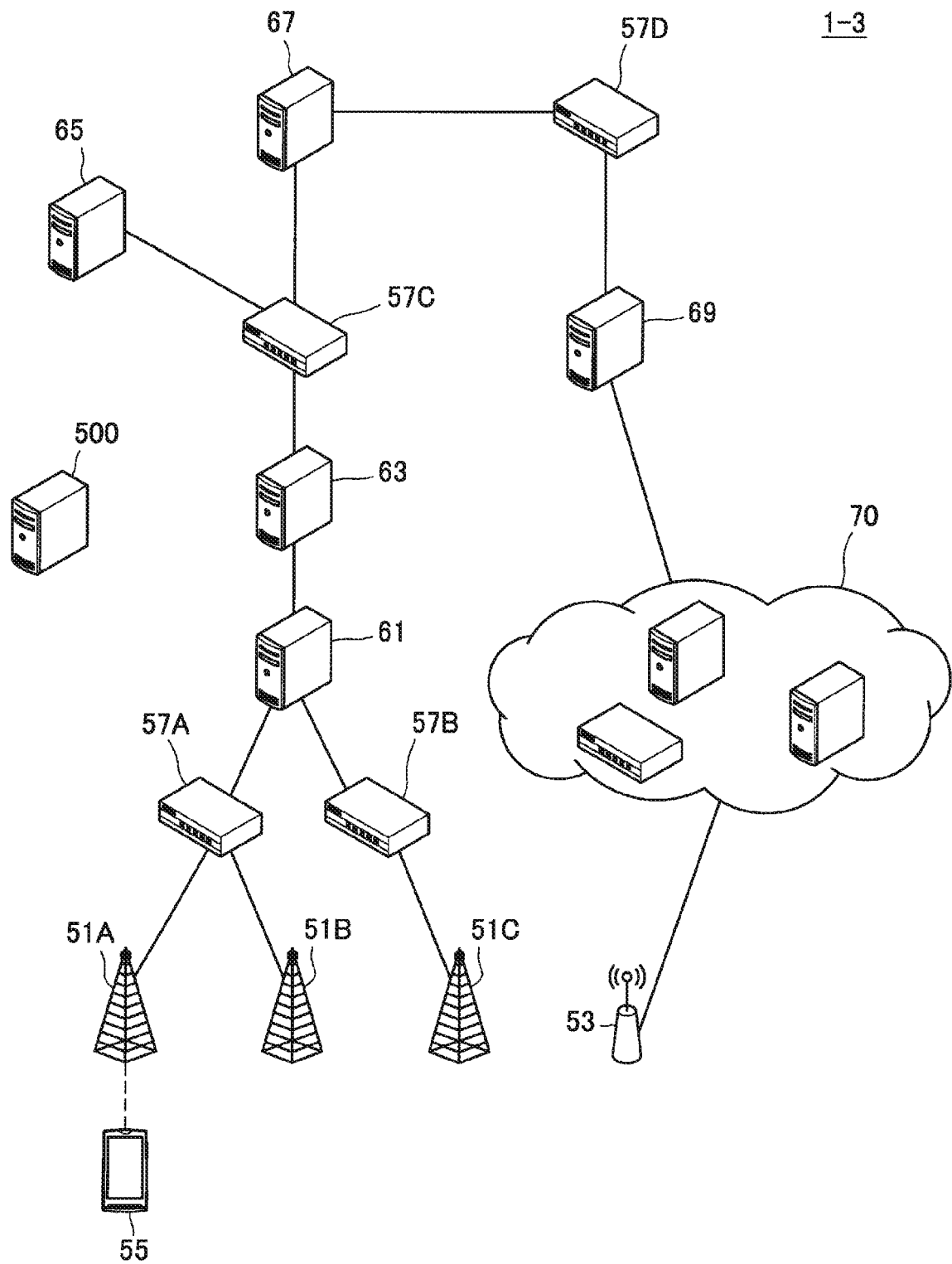
FIG. 28 is an explanatory diagram for describing an example of a schematic configuration of a cellular system according to a third embodiment.

First, a schematic configuration of a cellular system 1-3 according to the third embodiment will be described with reference to FIG. 28. FIG. 28 is an explanatory diagram for describing an example of a schematic configuration of the cellular system 1-3 according to the third embodiment. Referring to FIG. 28, the cellular system 1-3 according to the third embodiment includes a base station 51, a femtocell base station 53, a terminal device 55, a router 57, an MME 61, an S-GW 63, a PCRF 65, a P-GW 67, an HeNB-GW 69, and a network controller 500. The cellular system 1-3 is, for example, a system that conforms to LTE, LTE-Advanced, or a communication standard equivalent thereto.

In the third embodiment, the network controller 500 updates a transfer rule for a node based on mobility information related to mobility of the node or configuration/operation information related to a configuration/operation of the node, and notifies the node of the updated transfer rule. The transfer rule is, for example, a table for transfer.

The base station 51 may be the base station 100 according to the first embodiment. In this case, the transfer rule for the base station 51 may include the table described in the first embodiment (the table used for determining whether or not the data is able to be transferred without going through the gateway 21). Alternatively, the router 57A and the router 57B may be the network device 200 according to the second embodiment. In this case, the transfer rule for the router 57A and the router 57B may include the table in the second embodiment.

It is possible to intensively control, for example, the transfer in the cellular system through the network controller 500.

<3.2. Configuration of Network Controller>

Figure 29:
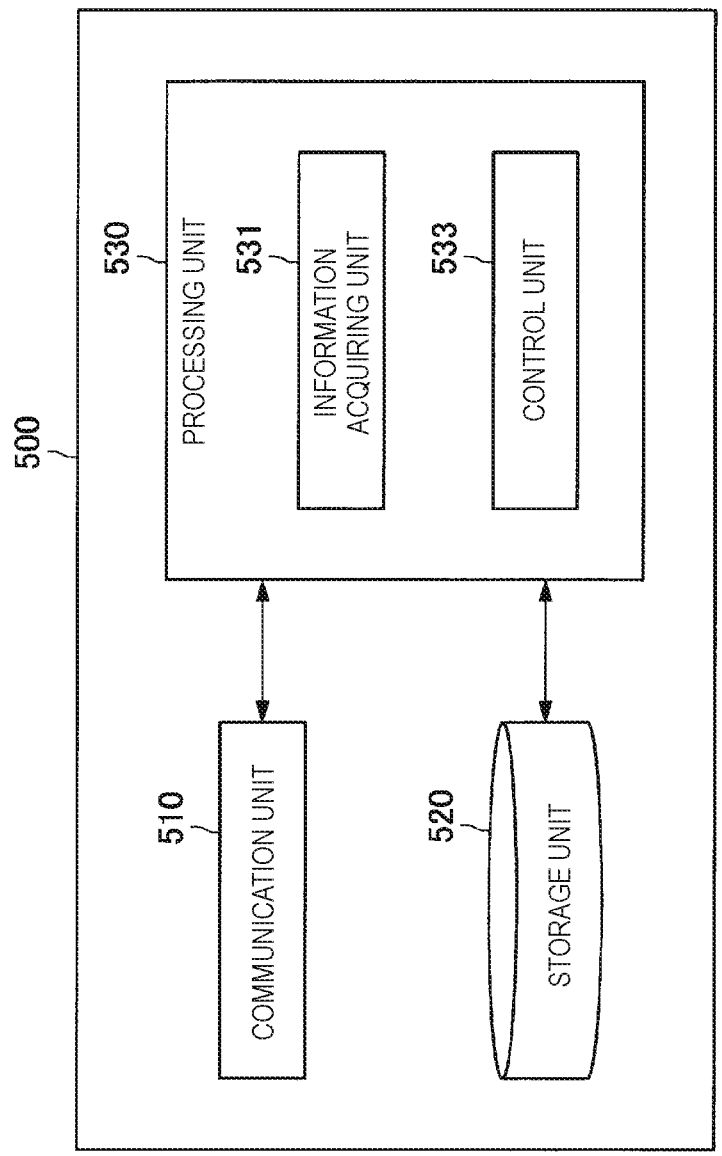
FIG. 29 is a block diagram illustrating an example of a configuration of a network controller according to the third embodiment.

Next, an example of a configuration of the network controller 500 according to the third embodiment will be described with reference to FIGS. 29 to 32. FIG. 29 is a block diagram illustrating an example of a configuration of the network controller 500 according to the third embodiment. Referring to FIG. 29, the network controller 500 includes a communication unit 530, a storage unit 520, and a processing unit 530.

(Communication Unit 510)

The communication unit 510 performs communication with another node. For example, the communication unit 510 performs communication with a base station (for example, the base station 51 and the femtocell base station 53), a router (for example, the router 57), a core network node (the MME 61, the S-GW 63, the PCRF 65, and the P-GW 67), and other nodes (for example, the HeNB-GW 69).

(Storage Unit 520)

The storage unit 520 temporarily or permanently stores a program and data for an operation of the network controller 500.

(Processing Unit 530)

The processing unit 530 provides various functions of the network controller 500. The processing unit 530 includes an information acquiring unit 531 and a control unit 533. The processing unit 530 may further include any other component in addition to the above-mentioned components. In other words, the processing unit 530 may also perform an operation other than operations of the above-mentioned components.

(Information Acquiring Unit 531)

(a) Acquisition of Mobility Information

For example, the information acquiring unit 531 acquires the mobility information related to the mobility of the node.

For example, the MME 61 provides the network controller 500 with the mobility information. Then, the information acquiring unit 531 acquires the mobility information. The MME 61 may provide the mobility information voluntarily (for example, at a predetermined timing) or may provide the mobility information according to a request from the network controller 500).

For example, the mobility information is a change of a serving cell by handover, a change of a tracking area, a change of an on/off state of a base station, a change of a status (for example, normal, master, slave, or the like) of a terminal device, a change of an RRC status (RRC_Connected or RRC_Idle), a period of time taken until a change of target information (for example, a cell staying period of time, a period of time in which a node is in an on/off state, or the like) occurs, or a combination thereof. As a specific example, the mobility information is the following information.

TABLE 1

| Target Node | Node Category | Change | Before Change | After Change | Time required for change |
|---|---|---|---|---|---|
| Node a | Category a-b-c | Serving cell | Cell ID xxx | Cell ID yyy | 60 sec |
| Node b | Category d-e-f | Change On/Off | On | Off | 180 sec |
| Node c | Category g-h-i | Change UE status | Normal UE | Master UE | 300 sec |
| Node d | Category j-k-l | Change TA | TA vvv | TA www | 600 sec |
| Node e | Category m-n-o | Change RRC status | RRC Idle | RRC Connect | 3600 sec |

(b) Acquisition of configuration/operation information

For example, the information acquiring unit 531 acquires configuration/operation information of the node related to the configuration/operation of the node.

The configuration/operation information is provided to the network controller 500, for example, when a configuration of a node is changed, an operation of a node is temporarily changed by network maintenance or the like when it is desired to change a rule of each application type, or the like. For example, the configuration/operation information may be provided from another node to the network controller 500 or may be manually provided to the network controller 500 by an operator.

(Control Unit 533)

(a) Creation/Update of Transfer Rule (a-1) Creation of Transfer Rule

For example, the control unit 533 creates the transfer rule for the node. For example, when the transfer rule for the node is not created, the control unit 533 creates the transfer rule for the node. The control unit 533 may create the transfer rule using an existing rule.

(a-2) Update of Transfer Rule

For example, the control unit 533 updates the transfer rule for the node.

Update Based on Mobility Information

For example, the control unit 533 updates the transfer rule for the node based on the mobility information related to the mobility of the node.

Specifically, for example, the control unit 533 determines whether or not there is a node whose connection destination has been changed based on the mobility information. When there is a node whose connection destination has been changed, the control unit 533 specifies the transfer rule (of another node) that is influenced by the change of the connection destination of the node, and updates the specified transfer rule. An example of the update of the transfer rule will be described below with reference to FIGS. 30 to 32.

Figure 30:
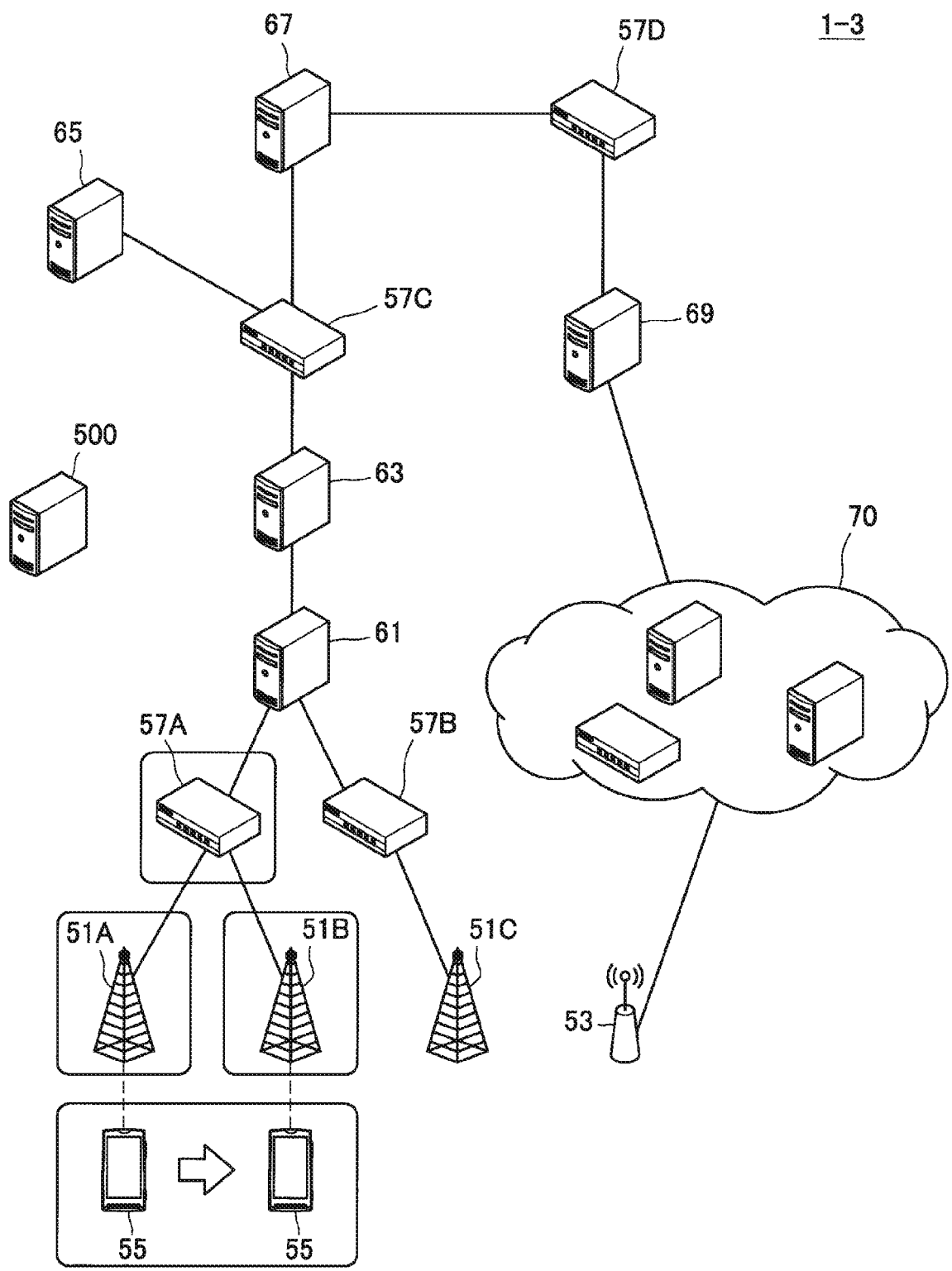
FIG. 30 is an explanatory diagram for describing a first example of influence of a transfer rule by mobility.

FIG. 30 is an explanatory diagram for describing a first example of the update of the transfer rule. Referring to FIG. 30, for example, due to the handover of the terminal device 55, the connection destination of the terminal device 55 changes from a base station 51A to a base station 51B. In this case, the control unit 533 specifies the transfer rules of the base station 51A, the router 57A, and the base station 51B as the transfer rule influenced by the change of the connection destination of the terminal device 55, and updates the transfer rules.

Figure 31:
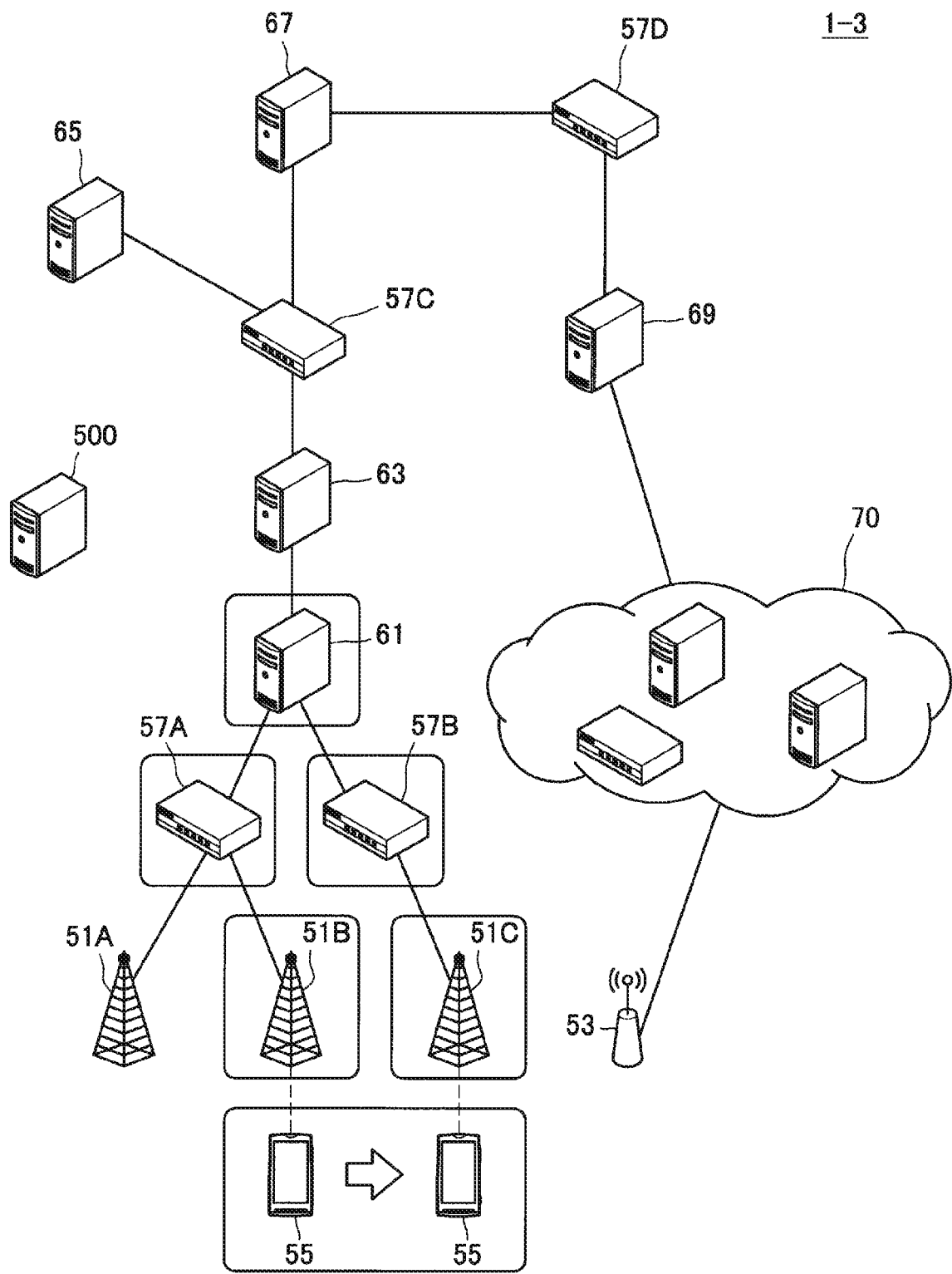
FIG. 31 is an explanatory diagram for describing a second example of influence of a transfer rule by mobility.

FIG. 31 is an explanatory diagram for describing a second example of the update of the transfer rule. Referring to FIG. 31, for example, due to the handover of the terminal device 55, the connection destination of the terminal device 55 changes from the base station 51B to a base station 51C. In this case, the control unit 533 specifies the transfer rules of the base station 51B, the router 57A, the MME 61, the router 57B, and the base station 51C as the transfer rule influenced by the change of the connection destination of the terminal device 55, and updates the transfer rules.

Figure 32:
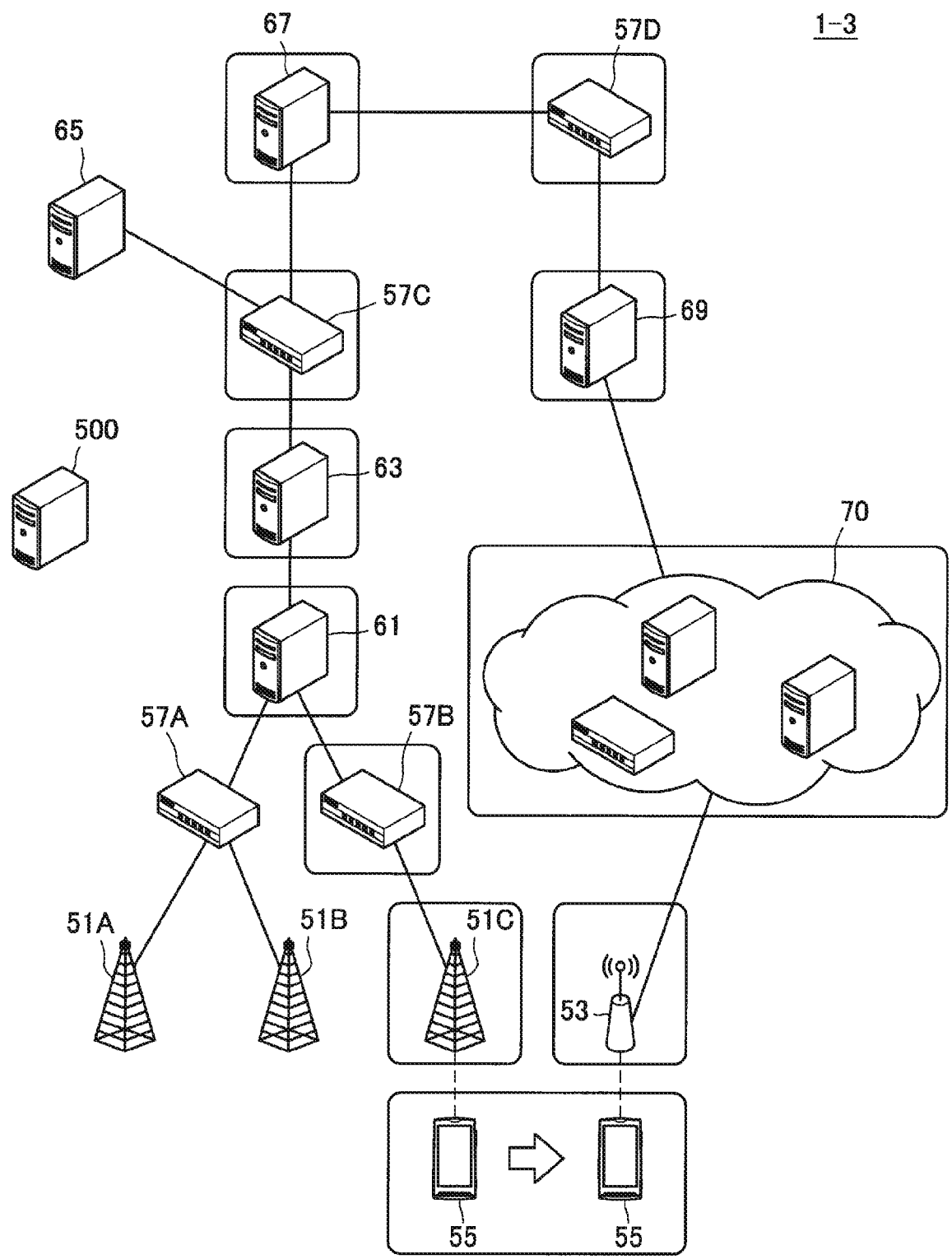
FIG. 32 is an explanatory diagram for describing a third example of influence of a transfer rule by mobility.

FIG. 32 is an explanatory diagram for describing a third example of the update of the transfer rule. Referring to FIG. 32, for example, due to the handover of the terminal device 55, the connection destination of the terminal device 55 changes from the base station 51C to the femtocell base station 53. In this case, the control unit 533 specifies the transfer rules of the base station 51C, the router 57B, the MME 61, the S-GW 63, the router 57C, the P-GW 67, the router 57D, the HeNB-GW 69, an external network 70 and the femtocell base station 53 as the transfer rule influenced by the change of the connection destination of the terminal device 55, and updates at least several transfer rules among the transfer rules. For example, at least several transfer rules are the transfer rule managed by the network controller 500 and do not include transfer rules that are not managed by the network controller 500 (for example, the transfer rule of the external network 70).

As described above, for example, the control unit 533 understands a network as a tree structure having a first node as a root, understands a second node whose connection destination is changed as a leaf of the tree structure, and specifies a transfer rule of a node positioned on a path from the root to the leaf as a transfer rule influenced by the change of the connection destination of the second node. The first node (that is, the root of the tree structure) is, for example, the MME 61, the S-GW 63, the P-GW 67, or the like.

Update Based on Configuration/Operation Information

The control unit 533 may update the transfer rule for the node based on the configuration/operation information related to the configuration/operation of the node.

The network controller 500 may cause a current transfer rule of each node included in the cellular system 1-3 to be held in the storage unit 520. Then, the control unit 533 may update the held transfer rules each time the transfer rule is created or updated.

(b) Notification of Transfer Rule

The control unit 533 notifies the node of the transfer rule for the node.

For example, the control unit 533 may notify the node of the entire new transfer rule (that is, a created transfer rule or an updated transfer rule) or may notify the node of a difference between a new rule and an old rule. As a specific example, the difference is the following information.

TABLE 2

| Target Packet | Destination Node to be changed | Change | Before Change | After Change |
|---|---|---|---|---|
| Data | Node a | forwarding destination node 1 | Node aa | Node ad |
| Data | Node b | forwarding destination node 3 | Node bb | N/A |
| Data Related Information | Node c | forwarding destination node 2 | Node cb | Node cd |
| Data Related Information | Node c | forwarding destination node 3 | Node cc | N/A |

For example, the node that is notified of the transfer rule applies the transfer rule. The node may give a notification indicating that the transfer rule has been applied to the network controller 500.

<3.3. Flow of Process>

Next, an example of a process according to the third embodiment will be described with reference to FIGS. 33 to 36.

(Overall Process)

Figure 33:
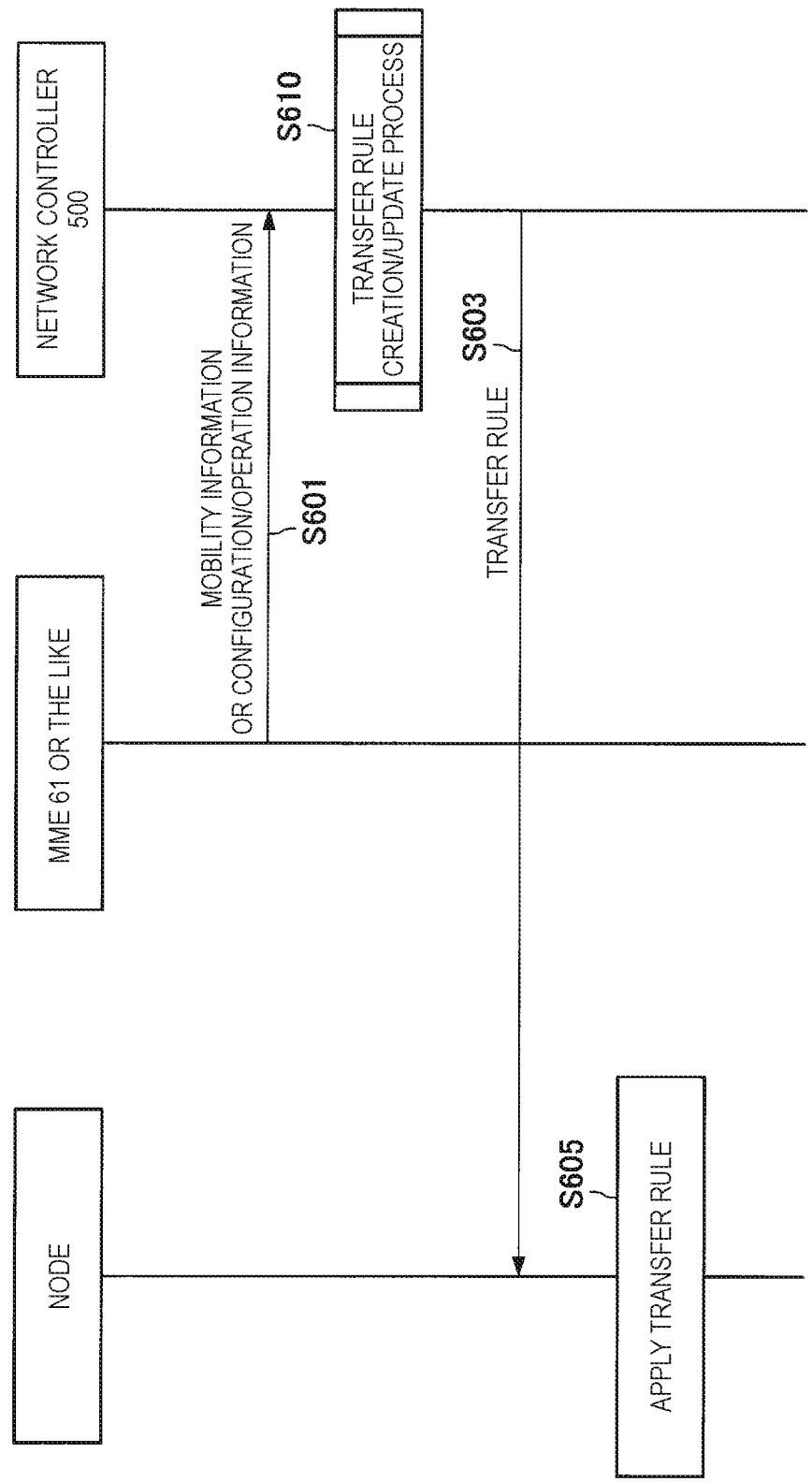
FIG. 33 is a sequence diagram illustrating an example of a schematic flow of a process according to the third embodiment.

FIG. 33 is a sequence diagram illustrating an example of a schematic flow of a process according to the third embodiment.

The MME 61 provides the mobility information related to the mobility of the node to the network controller 500 (S601). Alternatively, any one node provides the configuration/operation information related to the configuration/configuration of the node to the network controller 500 (S601).

The network controller 500 performs a transfer rule creation/update process (S610). In other words, the network controller 500 creates or updates the transfer rule for the node. Then, the network controller 500 notifies the node of the transfer rule (S603).

Thereafter, the node applies the transfer rule (S605).

(Transfer Rule Creation/Update Process)

(a) First Example

Figure 34:
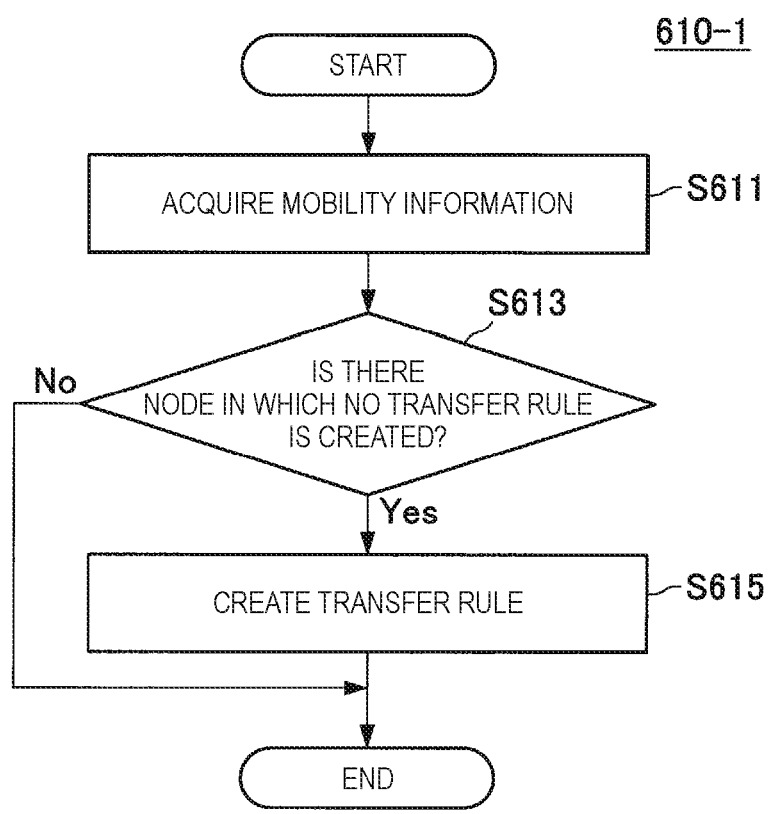
FIG. 34 is a flowchart illustrating a first example of a schematic flow of a transfer rule creation/update process according to the third embodiment.

FIG. 34 is a flowchart illustrating a first example of a schematic flow of the transfer rule creation/update process according to the third embodiment. The first example is an example of a process of creating the transfer rule.

The information acquiring unit 531 acquires the mobility information related to the mobility of the node (S611).

The control unit 533 determines whether or not there is a node in which no transfer rule is created (S613). When there is no node in which no transfer rule is created (NO in S613), the process ends.

When there is a node in which no transfer rule is created (YES in S613), the control unit 533 creates the transfer rule for the node (S615). Then, the process ends.

(b) Second Example

Figure 35:
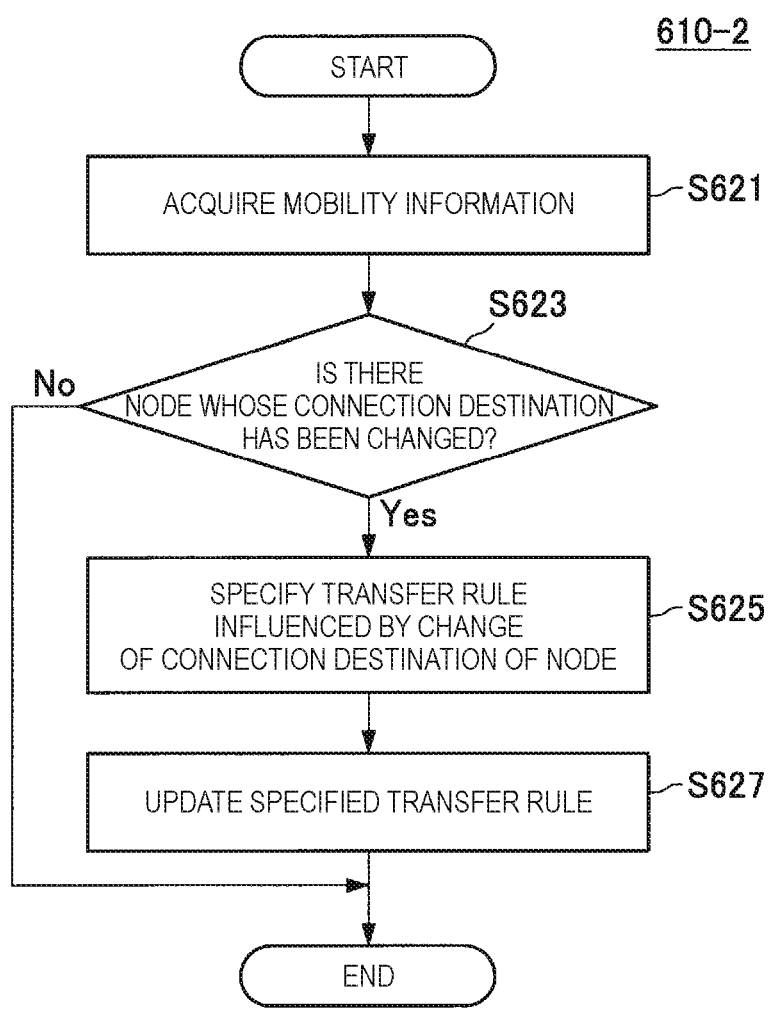
FIG. 35 is a flowchart illustrating a second example of a schematic flow of a transfer rule creation/update process according to the third embodiment.

FIG. 35 is a flowchart illustrating a second example of the schematic flow of the transfer rule creation/update process according to the third embodiment. The second example is an example of a process of updating the transfer rule based on the mobility information.

The information acquiring unit 531 acquires the mobility information related to the mobility of the node (S621).

The control unit 533 determines whether or not there is a node whose connection destination has been changed (S623). When there is no node whose connection destination has been changed (NO in S623), the process ends.

When there is a node whose connection destination has been changed (YES in S623), the control unit 533 specifies the transfer rule influenced by the change of the connection destination of the node (S625), and updates the specified transfer rule (S627). Then, the process ends.

(c) Third Example

Figure 36:
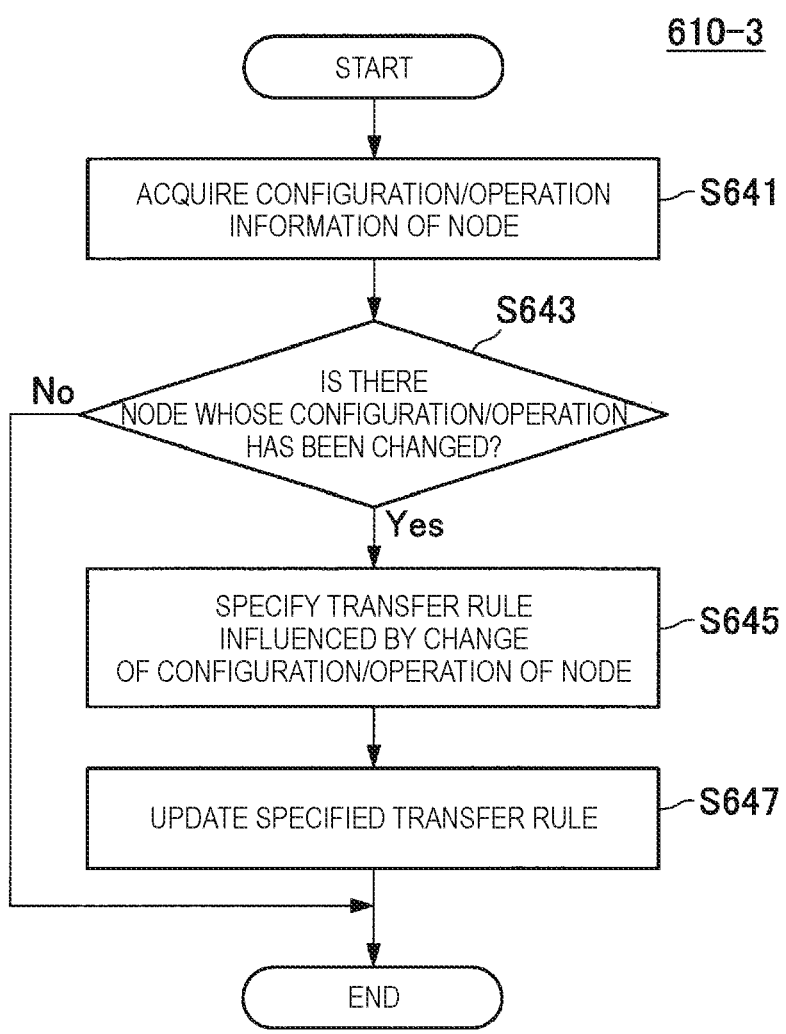
FIG. 36 is a flowchart illustrating a third example of a schematic flow of a transfer rule creation/update process according to the third embodiment.

FIG. 36 is a flowchart illustrating a third example of the schematic flow of the transfer rule creation/update process according to the third embodiment. The third example is an example of a process of updating the transfer rule based on the configuration/operation information.

The information acquiring unit 531 acquires the configuration/operation information related to the configuration/operation of the node (S641).

The control unit 533 determines whether or not there is a node whose configuration/operation has been changed (or a node whose configuration/operation is changed) (S643). When there is no node whose configuration/operation has been changed (NO in S643), the process ends.

When there is a node whose configuration/operation has been changed (YES in S643), the control unit 533 specifies the transfer rule influenced by the change of the configuration/operation of the node (S645), and updates the specified transfer rule (S647). Then, the process ends.

The third embodiment has been described above. In the above example, the example in which the MME 61 and the network controller 500 are implemented as different apparatuses has been described, but the third embodiment is not limited to the relevant example. For example, the MME 61 and the network controller 500 may be implemented in the same apparatus. Accordingly, the transfer rule can be more efficiently updated.

«4. Application Examples»

The technology according to the present disclosure is applicable to a variety of products. The network controller 500 may be implemented as any type of server such as tower servers, rack servers, and blade servers. At least a part of components of the network controller 500 may be implemented in a module (e.g. integrated circuit module that includes a single die, or card or blade that is inserted into a slot of a blade server) mounted on a server.

The base station 100 may also be implemented, for example, as any type of evolved Node B (eNB) such as macro eNBs and small eNBs. Small eNBs may cover smaller cells than the macrocells of pico eNBs, micro eNBs, or home (femt) eNBs. Instead, the base station 100 may be implemented as another type of base station such as Nodes B or base transceiver stations (BTSs). The base station 100 may include the main apparatus (which is also referred to as base station device) that controls wireless communication and one or more remote radio heads (RRHs) that are disposed at different locations from that of the main apparatus. Further, various types of terminals such as a smart phone, a tablet personal computer (PC), a laptop PC, and a portable/dongle type mobile router may operate as the base station 100 by executing a base station function temporarily or semipermanently. Further, at least some components of the base station 100 may be implemented in a base station device or a module for a base station device.

The network device 200 may be implemented as any one type of router such as a core router, a center router, an edge router, or a broadband router. The network device 200 may be implemented as a server having a virtual network device function (for example, a virtual router function). Further, at least some components of the network device 200 may be implemented in a module (for example, an integrated circuit module configured with one die) mounted on the router or the server.

<4.1. Application Examples for Network Controller>

Figure 37:
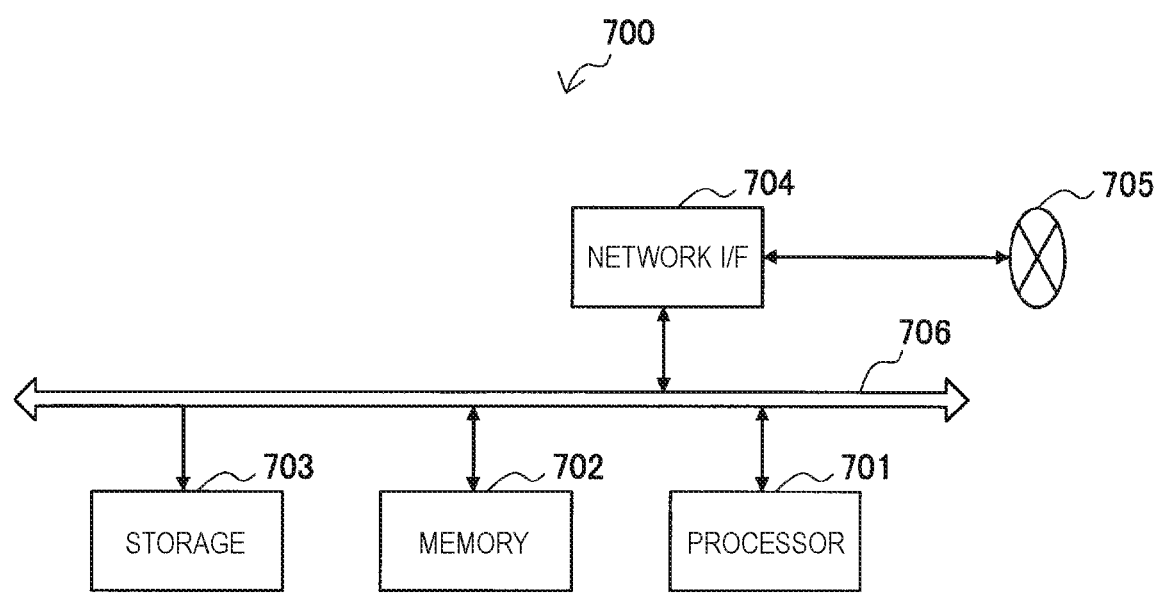
FIG. 37 is a block diagram illustrating an example of a schematic configuration of a server.

FIG. 37 is a block diagram illustrating an example of a schematic configuration of a server 700 to which the technology according to the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls various functions of the server 700. The memory 702 includes a random access memory (RAM) and a read only memory (ROM), and stores a program executed by the processor 701 and data. The storage 703 can include a storage medium such as semiconductor memories and hard disks.

The network interface 704 is a wired communication interface for connecting the server 700 to a wired communication network 705. The wired communication network 705 may be a core network such as evolved packet cores (EPCs), or a packet data network (PDN) such as the Internet.

The bus 706 connects the processor 701, the memory 702, the storage 703, and the network interface 704 to each other. The bus 706 may include two or more buses each having different speed (e.g. high speed bus and low speed bus).

In the server 700 illustrated in FIG. 37, the information acquiring unit 531 and the control unit 533 described above with reference to FIG. 29 may be mounted in the processor 701. As an example, a program causing a processor to function as the information acquiring unit 531 and the control unit 533 (that is, a program causing a processor to perform the operations of the information acquiring unit 531 and the control unit 533) may be installed in the server 700, and the processor 701 may execute the program. As another example, the server 700 may be equipped with a module including the processor 701 and the memory 702, and the information acquiring unit 531 and the control unit 533 may be mounted in the module. In this case, the module may store the program causing the processor to function as the information acquiring unit 531 and the control unit 533 in the memory 702, and the program may be executed by the processor 701. As described above, the server 700 or the module may be provided as an apparatus equipped with the information acquiring unit 531 and the control unit 533, and the program causing the processor to function as OO, the information acquiring unit 531, and the control unit 533 may be provided. A recording medium having the program recorded therein may be provided.

<4.2. Application Examples for Base Station>

First Application Example

Figure 38:
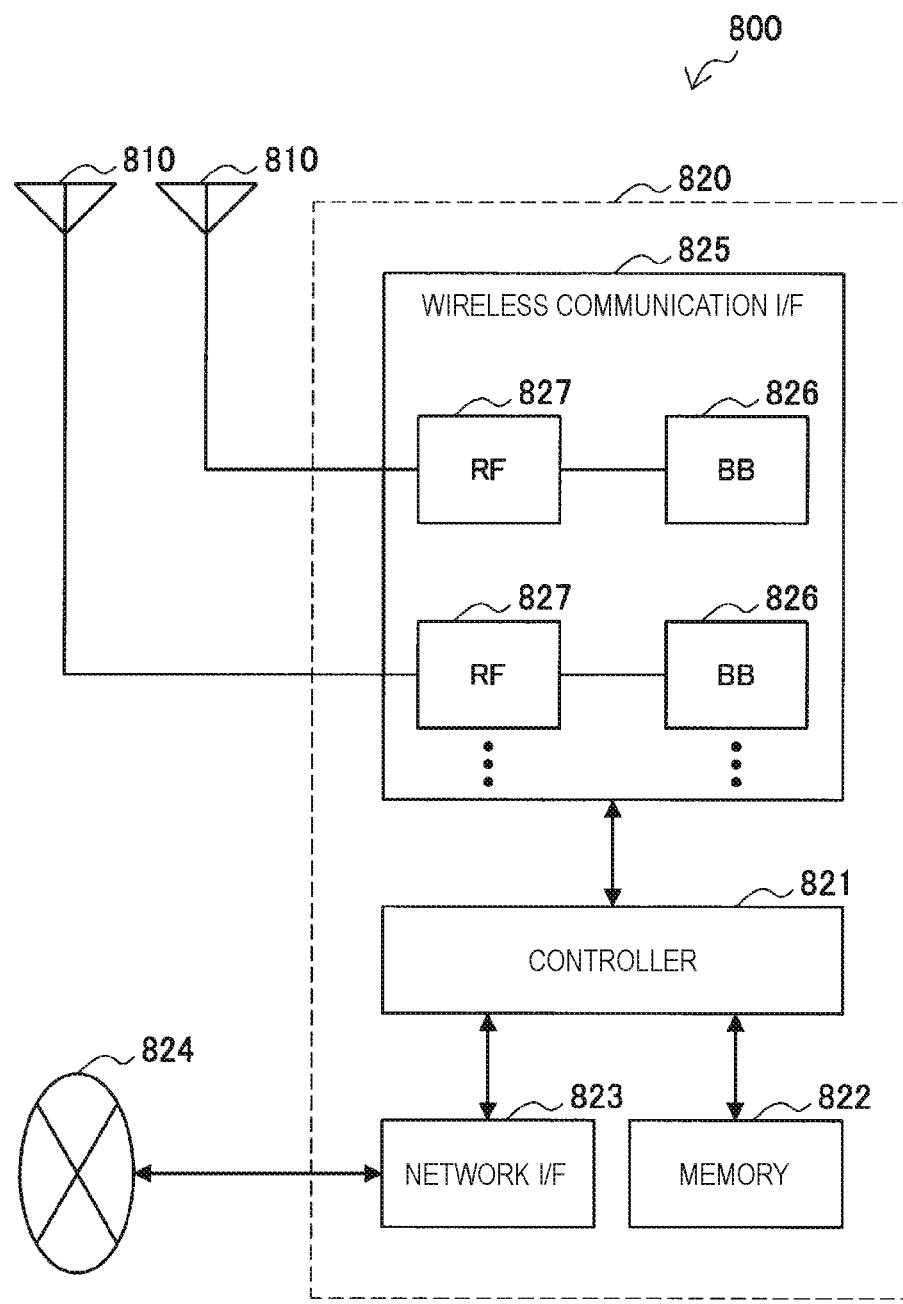
FIG. 38 is a block diagram illustrating a first example of a schematic configuration of an eNB.

FIG. 38 is a block diagram illustrating a first example of a schematic configuration of an eNB to which the technology according to the present disclosure may be applied. An eNB 800 includes one or more antennas 810 and a base station device 820. Each antenna 810 and the base station device 820 may be connected to each other via an RF cable.

Each of the antennas 810 includes a single or a plurality of antenna elements (e.g. a plurality of antenna elements constituting a MIMO antenna) and is used for the base station device 820 to transmit and receive a wireless signal. The eNB 800 may include the plurality of the antennas 810 as illustrated in FIG. 38, and the plurality of antennas 810 may, for example, correspond to a plurality of frequency bands used by the eNB 800. It should be noted that while FIG. 38 illustrates an example in which the eNB 800 includes the plurality of antennas 810, the eNB 800 may include the single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, and scheduling. The control may be performed in cooperation with a surrounding eNB or a core network. The memory 822 includes a RAM and a ROM, and stores a program executed by the controller 821 and a variety of control data (such as, for example, terminal list, transmission power data, and scheduling data).

The network interface 823 is a communication interface for connecting the base station device 820 to the core network 824. The controller 821 may communicate with a core network node or another eNB via the network interface 823. In this case, the controller 821 may be mutually connected to the eNB 800 and a core network node or another eNB through a logical interface (e.g. S1 interface or X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have part or all of the logical functions as discussed above instead of the controller 821. The BB processor 826 may be a module including a memory having a communication control program stored therein, a processor to execute the program, and a related circuit, and the function of the BB processor 826 may be changeable by updating the program. The module may be a card or blade to be inserted into a slot of the base station device 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 38, and the plurality of BB processors 826 may, for example, correspond to a plurality of frequency bands used by the eNB 800. The wireless communication interface 825 may also include a plurality of the RF circuits 827, as illustrated in FIG. 38, and the plurality of RF circuits 827 may, for example, correspond to a plurality of antenna elements. FIG. 38 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 38, the information acquiring unit 151 and the communication control unit 153 described above with reference to FIG. 2 may be mounted in the controller 821. Alternatively, at least some of the components may be mounted in the wireless communication interface 825. As an example, the eNB 800 may be equipped with a module including all or a part (for example, the BB processor 826) of the wireless communication interface 825 and/or the controller 821, and the information acquiring unit 151 and the communication control unit 153 may be mounted in the module. In this case, the module may store a program causing a processor to function as the information acquiring unit 151 and the communication control unit 153 (that is, a program causing a processor to perform the operations of the information acquiring unit 151 and the communication control unit 153) and perform the program. As another example, the program causing the processor to function as the information acquiring unit 151 and the communication control unit 153 may be installed in the eNB 800, and the wireless communication interface 825 (for example, the BB processor 826) and/or the controller 821 may execute the program. As described above, the eNB 800, the base station device 820, or the module may be provided as an apparatus equipped with the information acquiring unit 151 and the communication control unit 153, and the program causing the processor to function as the information acquiring unit 151 and the communication control unit 153 may be provided. A recording medium having the program recorded therein may be provided.

In the eNB 800 illustrated in FIG. 38, the wireless communication unit 320 described above with reference to FIG. 2 may be mounted in the wireless communication interface 825 (for example, the RF circuit 827). The antenna unit 110 may be mounted in the antenna 810. The network communication unit 130 may be mounted in the controller 821 and/or the network interface 823.

Second Application Example

Figure 39:
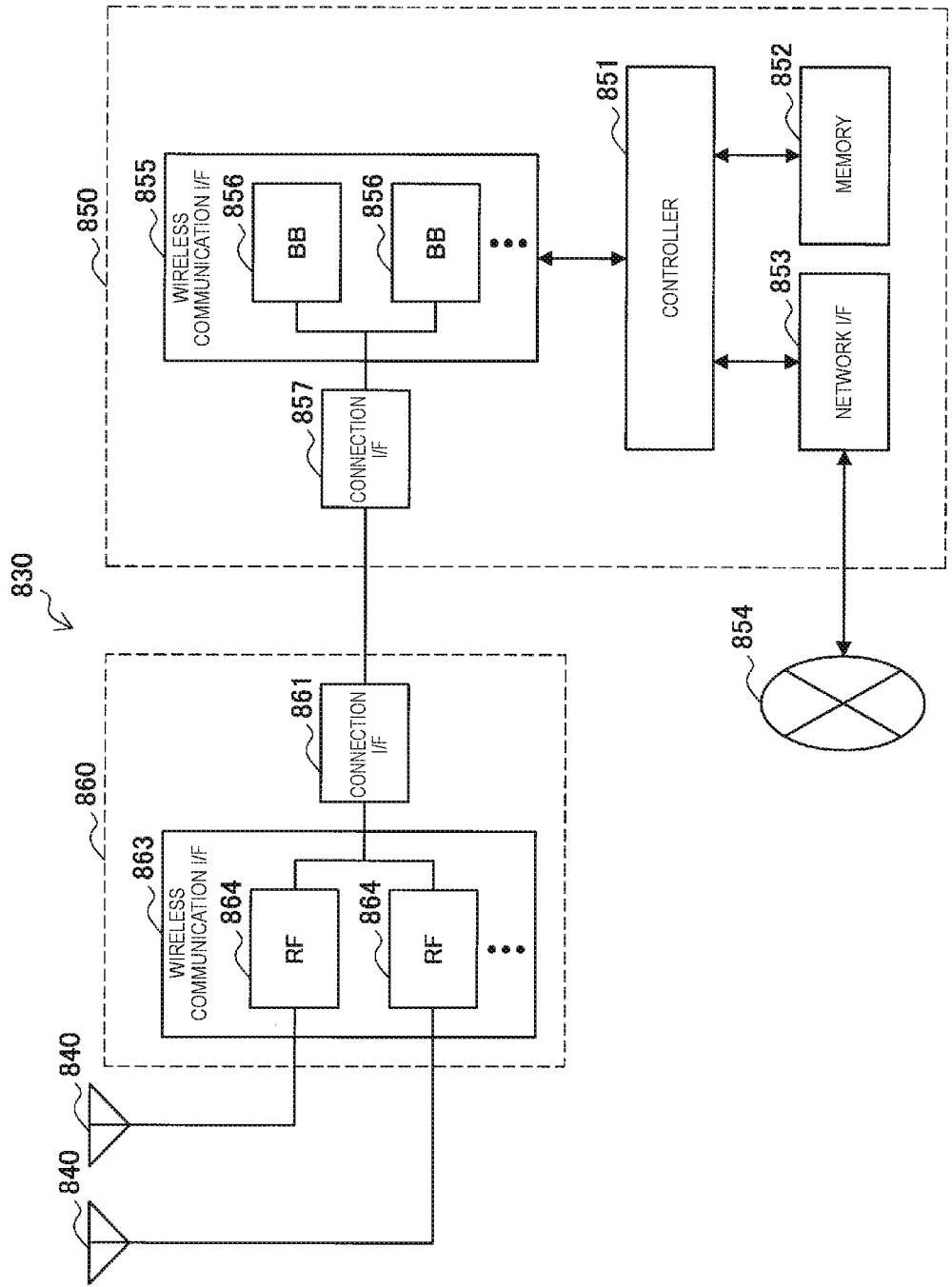
FIG. 39 is a block diagram illustrating a second example of the schematic configuration of the eNB.

FIG. 39 is a block diagram illustrating a second example of a schematic configuration of an eNB to which the technology according to the present disclosure may be applied. An eNB 830 includes one or more antennas 840, a base station device 850, and an RRH 860. Each of the antennas 840 and the RRH 860 may be connected to each other via an RF cable. The base station device 850 and the RRH 860 may be connected to each other by a high speed line such as optical fiber cables.

Each of the antennas 840 includes a single or a plurality of antenna elements (e.g. antenna elements constituting a MIMO antenna), and is used for the RRH 860 to transmit and receive a wireless signal. The eNB 830 may include a plurality of the antennas 840 as illustrated in FIG. 39, and the plurality of antennas 840 may, for example, correspond to a plurality of frequency bands used by the eNB 830. FIG. 39 illustrates an example in which the eNB 830 includes the plurality of antennas 840, but the eNB 830 may include the single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 38.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856. The BB processor 856 is the same as the BB processor 826 described with reference to FIG. 38 except that the BB processor 856 is connected to an RF circuit 864 of the RRH 860 via the connection interface 857. The wireless communication interface 855 may include a plurality of the BB processors 856, as illustrated in FIG. 39, and the plurality of BB processors 856 may, for example, correspond to a plurality of frequency bands used by the eNB 830 respectively. FIG. 39 illustrates an example in which the wireless communication interface 855 includes the plurality of BB processors 856, but the wireless communication interface 855 may include the single BB processor 856.

The connection interface 857 is an interface for connecting the base station device 850 (wireless communication interface 855) to the RRH 860. The connection interface 857 may be a communication module for communication on the high speed line which connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of the RF circuits 864 as illustrated in FIG. 39, and the plurality of RF circuits 864 may, for example, correspond to a plurality of antenna elements. FIG. 39 illustrates an example in which the wireless communication interface 863 includes the plurality of RF circuits 864, but the wireless communication interface 863 may include the single RF circuit 864.

In the eNB 830 illustrated in FIG. 39, the information acquiring unit 151 and the communication control unit 153 described above with reference to FIG. 2 may be mounted in the controller 851. Alternatively, at least some of the components may be mounted in the wireless communication interface 855 and/or the wireless communication interface 863. As an example, the eNB 830 may be equipped with a module including all or a part (for example, the BB processor 856) of the wireless communication interface 855 and/or the controller 851, and the information acquiring unit 151 and the communication control unit 153 may be mounted in the module. In this case, the module may store a program causing a processor to function as the information acquiring unit 151 and the communication control unit 153 (that is, a program causing a processor to perform the operations of the information acquiring unit 151 and the communication control unit 153) and perform the program. As another example, the program causing the processor to function as the information acquiring unit 151 and the communication control unit 153 may be installed in the eNB 830, and the wireless communication interface 855 (for example, the BB processor 856) and/or the controller 851 may execute the program. As described above, the eNB 830, the base station device 850, or the module may be provided as an apparatus equipped with the information acquiring unit 151 and the communication control unit 153, and the program causing the processor to function as the information acquiring unit 151 and the communication control unit 153 may be provided. A recording medium having the program recorded therein may be provided.

In the eNB 830 illustrated in FIG. 39, the wireless communication unit 120 described above with reference to FIG. 2 may be mounted in the wireless communication interface 863 (for example, the RF circuit 864). The antenna unit 110 may be mounted in the antenna 840. The network communication unit 130 may be mounted in the controller 851 and/or the network interface 853.

<4.3. Application Examples for Network Device>

Figure 40:
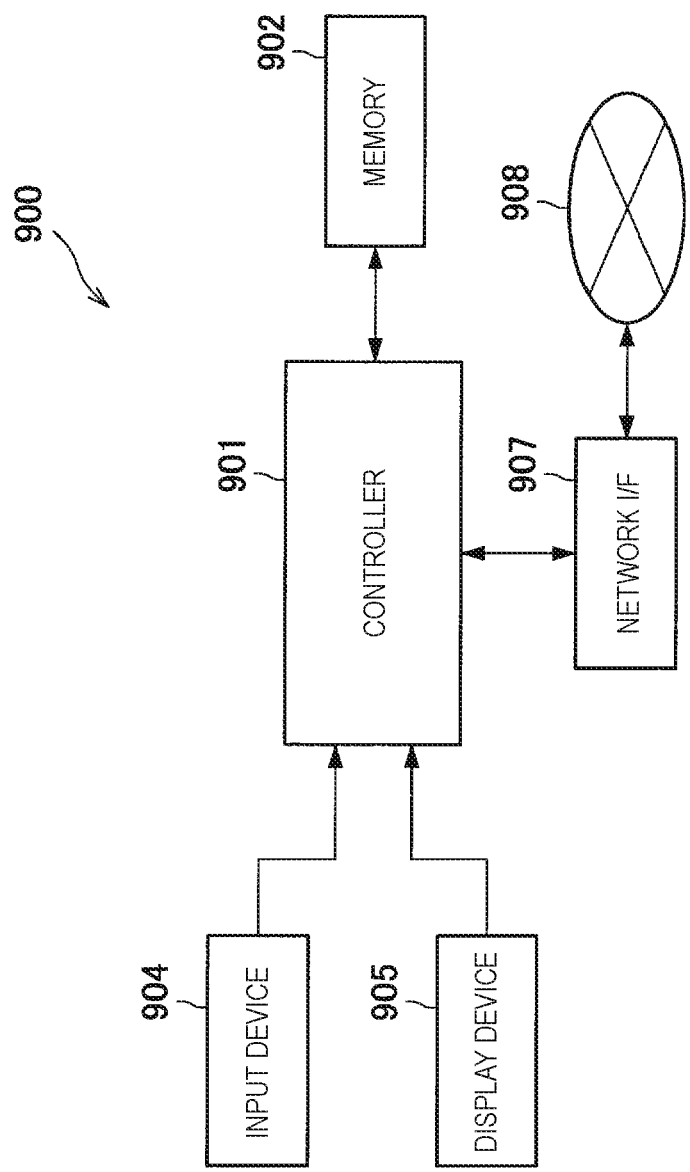
FIG. 40 is a block diagram illustrating an example of a schematic configuration of a router.

FIG. 40 is a block diagram illustrating an example of a schematic configuration of a router 900 to which the technology according to the present disclosure is applicable. The router 900 includes a controller 901, a memory 902, an input device 904, a display device 905, and a network interface 907.

The controller 901 may be, for example, a CPU or a Digital Signal Processor (DSP), and operates functions (for example, routing, filtering, and the like) of an IP layer of the router 900. The controller 901 may further operate functions of a layer higher than the IP layer. The memory 952 includes a RAM and a ROM and stores a program executed by the controller 951 and various control data (for example, a routing table, a log, and the like).

The input device 904 includes, for example, a button, a switch, and the like and receives an operation from the user. The display device 905 includes an LED lamp or the like, and displays an operation status of the router 900.

The network interface 907 is a wire communication interface that enables the router 900 to be connected with the wire communication network 908. The network interface 907 may include a plurality of connection terminals. The wire communication network 908 may be a LAN such as Ethernet (a registered trademark) or a Wide Area Network (WAN).

In the router 900 illustrated in FIG. 40, the information acquiring unit 231 and the communication control unit 233 described above with reference to FIG. 17 may be mounted in the controller 901. As an example, the router 900 may be quipped with a module including the controller 901 (and the memory 902), and the information acquiring unit 231 and the communication control unit 233 may be mounted in the module. In this case, the module may store a program causing a processor to function as the information acquiring unit 231 and the communication control unit 233 (that is, a program causing a processor to perform the operations of the information acquiring unit 231 and the communication control unit 233) and execute the program. As another example, the program causing the processor to function as the information acquiring unit 231 and the communication control unit 233 may be installed in the router 900, and the controller 901 may execute the program. As described above, the router 900 or the module may be provided as an apparatus equipped with the information acquiring unit 231 and the communication control unit 233, and the program causing the processor to function as the information acquiring unit 231 and the communication control unit 233 may be provided. A recording medium having the program recorded therein may be provided.

«5. Conclusion»

The apparatuses and the processes according to the embodiments of the present disclosure have been described above with reference to FIGS. 1 to 40. An apparatuses according to an embodiment of the present disclosure includes an information acquiring unit that acquire data destined for a second terminal device which is transmitted from a first terminal device to a base station of a cellular system and a communication control unit that a communication control unit that controls transmission of the data such that the data is transferred from the first terminal device to the second terminal device without going through a gateway that performs data transfer in the cellular system. The communication control unit controls transmission of information related to the data to the gateway or a specific node. The specific node is a node that receives information related to another data which is transferred via the gateway from the gateway.

Accordingly, for example, it is possible to perform management related to transmission and reception of data while reducing the load on the core network. More specifically, for example, since the data is transferred without going through the gateway, the load on the gateway from the data transfer can be reduced. Further, since the data-related information is transmitted to the gateway or the specific node, management related to transmission and reception of data with no going through the gateway can be also performed.

In the first embodiment, the apparatus is the base station 100, a base station device for the base station 100, or a module for the base station device, in the second embodiment, the apparatus is the network device 200 or a module for the network device 200.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the example in which the cellular system is a system that conforms to LTE, LTE-Advanced, or a communication standard equivalent thereto has been described, but the present disclosure is not limited to the relevant example. For example, the cellular system may be a system that conforms to any other communication standard.

Further, it is not always necessary to execute the processing steps in the processing in the present specification in chronological order in order described in the flowcharts or the sequence diagrams. For example, the processing steps in the above-described processing may be executed in order different from the order described in the flowcharts or the sequence diagrams or may be executed in parallel.

Further, it is also possible to create a computer program for making a processor (such as, for example, a CPU and a DSP) provided at nodes (such as, the base station or the network device) in the present specification function as the components (for example, an information acquiring unit or the communication control unit) of the above-described nodes (in other words, a computer program for making the processor execute operation of the components of the above-described nodes). Further, it is also possible to provide a recording medium having the above-described computer program recorded therein. Further, it is also possible to provide an apparatus (such as, for example, a finished product and a module (such as parts, processing circuits and chips) for the finished product) including a memory having the above-described computer program stored therein and one or more processors which can execute the above-described computer program. Further, a method including the operation of the components (for example, an information acquiring unit or the communication control unit) of the above-described nodes is included in the technique according to the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An apparatus, including:

an acquiring unit configured to acquire data destined for a second terminal device which is transmitted from a first terminal device to a base station of a cellular system; and a control unit configured to control transmission of the data in a manner that the data is transferred from the first terminal device to the second terminal device without going through a gateway configured to perform data transfer in the cellular system, wherein the control unit controls transmission of information related to the data to the gateway or a specific node, and the specific node is a node configured to receive, from the gateway, information related to another data transferred via the gateway.

(2)

The apparatus according to (1), wherein the information related to the data includes information about at least one of the first terminal device and the second terminal device.

(3)

The apparatus according to (1) or (2), wherein the information related to the data includes information indicating an amount of the data.

(4)

The apparatus according to any one of (1) to (3), wherein the information related to the data includes information indicating an amount of radio resources used for transmission of the data.

(5)

The apparatus according to any one of (1) to (4), wherein the information related to the data includes information for charging for transmission and reception of the data.

(6)

The apparatus according to (5), wherein the control unit controls transmission of the information to the gateway or the specific node by a Bearer Binding and Event Reporting Function (BBERF).

(7)

The apparatus according to any one of (1) to (6), wherein the information related to the data is information related to data of a packet unit.

(8)

The apparatus according to (7), wherein the acquiring unit acquires an integrated packet in which the information related to the data and the data are encapsulated, and separates the information related to data and the data from the integrated packet.

(9)
The apparatus according to (8),
wherein the integrated packet includes predetermined indication information indicating that the information related to data and the data are encapsulated in the integrated packet.
(10)
The apparatus according to any one of (1) to (6),
wherein the information related to the data is information related to data of a session unit.
(11)
The apparatus according to any one of (1) to (7) and (10),
wherein the control unit generates the information related to the data.
(12)
The apparatus according to any one of (1) to (11),
wherein, when a condition for transfer from the first terminal device to the second terminal device is satisfied, the control unit controls transmission of the data in a manner that the data is transferred from the first terminal device to the second terminal device without going through the gateway, and controls transmission of the information to the gateway or the specific node.
(13)
The apparatus according to (12),
wherein the condition is that the data is able to be transferred from the first terminal device to the second terminal device without going through the gateway.
(14)
The apparatus according to any one of (1) to (13),
wherein the gateway is a serving gateway.
(15)
The apparatus according to any one of (1) to (14),
wherein the apparatus is the base station, a base station device for the base station, or a module for the base station device.
(16)
The apparatus according to any one of (1) to (14),
wherein the apparatus is a network device or a module for a network device.
(17)
A method, including:
acquiring data destined for a second terminal device which is transmitted from a first terminal device to a base station of a cellular system;
controlling, by a processor, transmission of the data in a manner that the data is transferred from the first terminal device to the second terminal device without going through a gateway configured to perform data transfer in the cellular system; and
controlling, by the processor, transmission of information related to the data to the gateway or a specific node,
wherein the specific node is a node configured to receive, from the gateway, information related to another data transferred via the gateway.
(18)
A program for causing a processor to execute:
acquiring data destined for a second terminal device which is transmitted from a first terminal device to a base station of a cellular system;
controlling transmission of the data in a manner that the data is transferred from the first terminal device to the second terminal device without going through a gateway configured to perform data transfer in the cellular system; and
controlling transmission of information related to the data to the gateway or a specific node,
wherein the specific node is a node configured to receive, from the gateway, information related to another data transferred via the gateway.
(19)
A recording medium having a program stored therein, the program causing a processor to execute:
acquiring data destined for a second terminal device which is transmitted from a first terminal device to a base station of a cellular system;
controlling transmission of the data in a manner that the data is transferred from the first terminal device to the second terminal device without going through a gateway configured to perform data transfer in the cellular system; and
controlling transmission of information related to the data to the gateway or a specific node,
wherein the specific node is a node configured to receive, from the gateway, information related to another data transferred via the gateway.

REFERENCE SIGNS LIST

1-1, 1-2 cellular system
10 base station
20 core network
21 gateway
30 terminal device
50 integrated packet
100 base station
151 information acquiring unit
153 communication control unit
200 network device
251 information acquiring unit
253 communication control unit

The invention claimed is:
1. An apparatus, comprising:
circuitry configured to:
    acquire data transmitted from a first terminal device to a second terminal device via a base station of a cellular system;
    control transmission of the acquired data from the first terminal device to the second terminal device, without transmitting the acquired data to a core network node, based on stored information in the base station, the stored information including identification information of the base station and identification information of the second terminal device, the core network node being configured to perform data transfer in the cellular system;
    control transmission of information related to the data to the core network node; and
    control transmission of the acquired data from the base station to the second terminal device without transmitting the acquired data to the core network node when the identification information of the second terminal device is in the stored information,
wherein the circuitry is further configured to acquire an integrated packet in which the information related to the data and the data are encapsulated, and separate the information related to the data and the data from the integrated packet, and
wherein the integrated packet includes predetermined indication information indicating that the information related to data and the data are encapsulated in the integrated packet.

2. The apparatus according to claim 1, wherein the information related to the data includes information about at least one of the first terminal device and the second terminal device.

3. The apparatus according to claim 1, wherein the information related to the data includes information indicating an amount of the data.

4. The apparatus according to claim 1, wherein the information related to the data includes information indicating an amount of radio resources used for transmission of the data.

5. The apparatus according to claim 1, wherein the information related to the data includes information for charging for transmission and reception of the data.

6. The apparatus according to claim 5, wherein the circuitry is further configured to control transmission of the information to the core network node by a Bearer Binding and Event Reporting Function (BBERF).

7. The apparatus according to claim 1, wherein the information related to the data is information related to data of a packet unit.

8. The apparatus according to claim 1, wherein the information related to the data is information related to data of a session unit.

9. The apparatus according to claim 1, wherein the circuitry is further configured to generate the information related to the data.

10. The apparatus according to claim 1, wherein, when a condition for transfer from the first terminal device to the second terminal device is satisfied, the circuitry is further configured to control transmission of the data in a manner that the data is transferred from the first terminal device to the second terminal device without going through the core network node, and control transmission of the information to the core network node.

11. The apparatus according to claim 10, wherein the condition is that the data is able to be transferred from the first terminal device to the second terminal device without going through the core network node.

12. The apparatus according to claim 1, wherein the core network node is a serving gateway.

13. The apparatus according to claim 1, wherein the apparatus is the base station, a base station device for the base station, or a module for the base station device.

14. The apparatus according to claim 1, wherein the apparatus is a network device or a module for a network device.

15. A method, comprising:
acquiring data transmitted from a first terminal device to a second terminal device via a base station of a cellular system;
controlling, by a processor, transmission of the acquired data from the first terminal device to the second terminal device, without transmitting the acquired data to a core network node, based on stored information in the base station, the stored information including identification information of the base station and identification information of the second terminal device, the core network node being configured to perform data transfer in the cellular system;
controlling, by the processor, transmission of information related to the data to the core network node;
controlling transmission of the acquired data from the base station to the second terminal device without transmitting the acquired data to the core network node when the identification information of the second terminal device is in the stored information; and
acquiring an integrated packet in which the information related to the data and the data are encapsulated, and separate the information related to the data and the data from the integrated packet,
wherein the integrated packet includes predetermined indication information indicating that the information related to data and the data are encapsulated in the integrated packet.

16. The method according to claim 15, wherein the information related to the data includes information about at least one of the first terminal device and the second terminal device.

17. The method according to claim 15, wherein the information related to the data includes information indicating an amount of the data.

18. The method according to claim 15, wherein the information related to the data includes information indicating an amount of radio resources used for transmission of the data.

* * * * *